May 3, 1938.    H. A. HICKS    2,115,913

MOTOR VEHICLE BODY

Filed March 11, 1935    9 Sheets-Sheet 1

INVENTOR
Harold A. Hicks.
BY
Harness, Dind, Patee & Harris
ATTORNEYS.

May 3, 1938.  H. A. HICKS  2,115,913
MOTOR VEHICLE BODY
Filed March 11, 1935   9 Sheets-Sheet 2
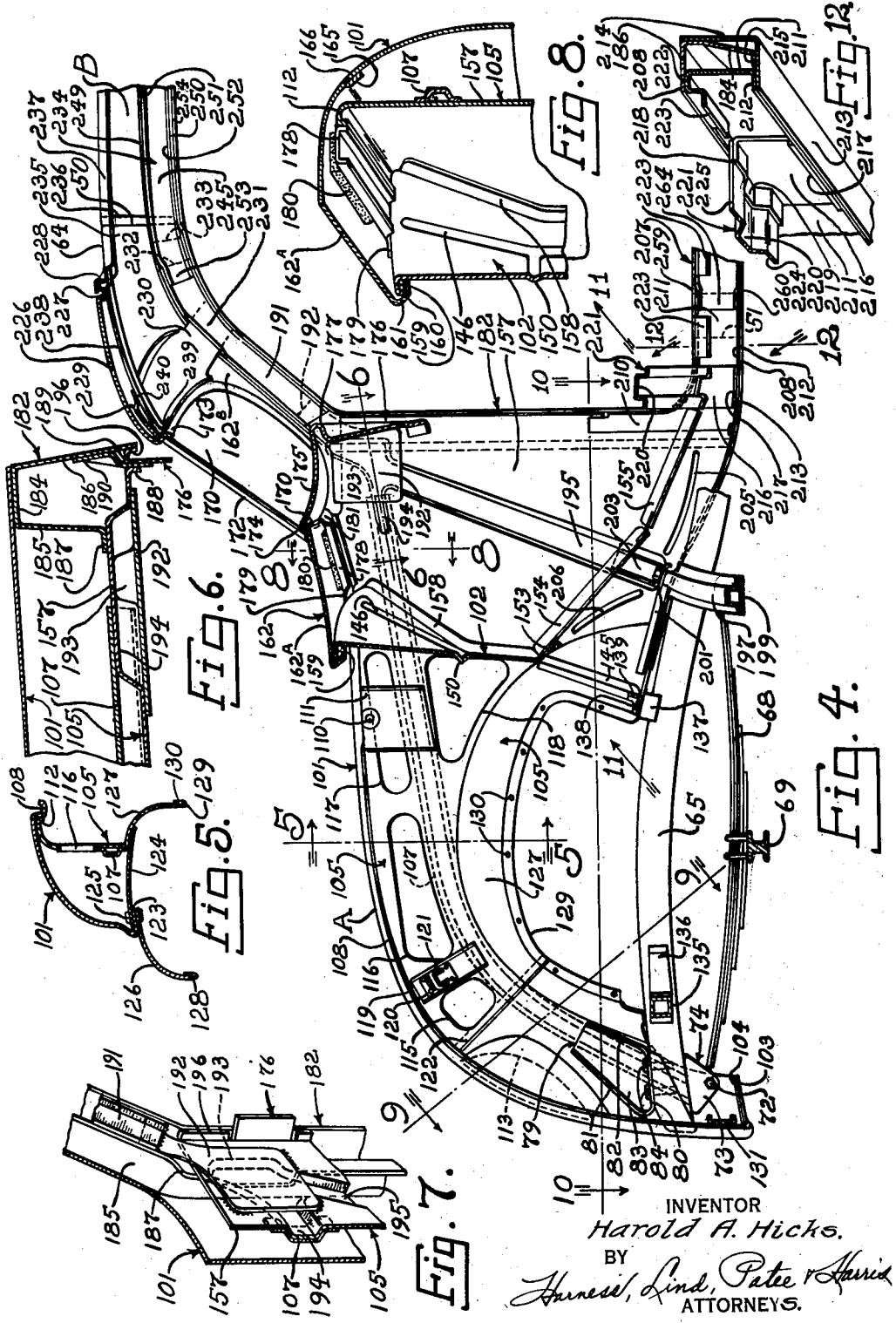
INVENTOR
Harold A. Hicks.
BY
Harness, Dind, Patee & Harris
ATTORNEYS.

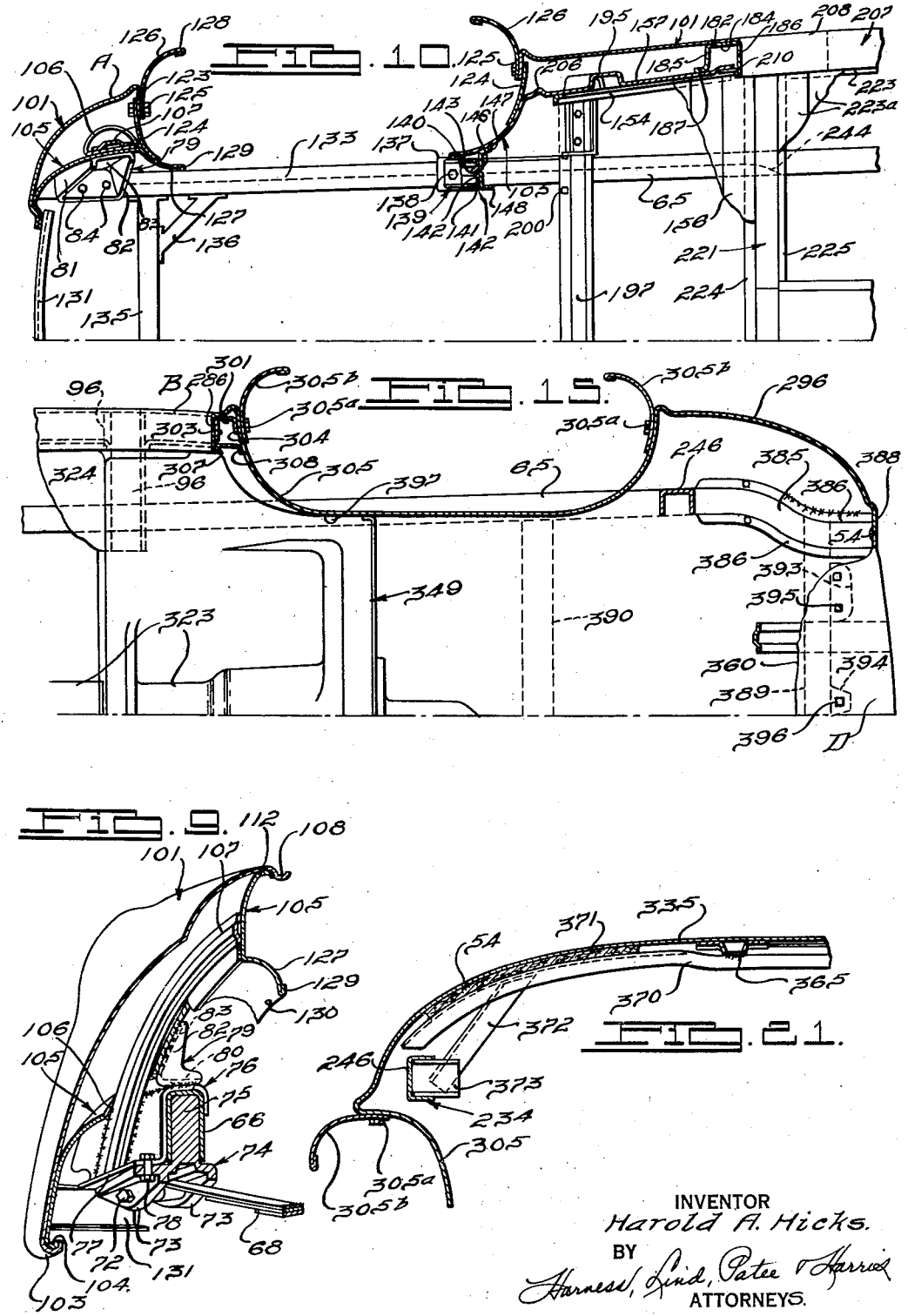

INVENTOR
Harold A. Hicks.
BY
ATTORNEYS.

May 3, 1938. H. A. HICKS 2,115,913
MOTOR VEHICLE BODY
Filed March 11, 1935 9 Sheets-Sheet 5
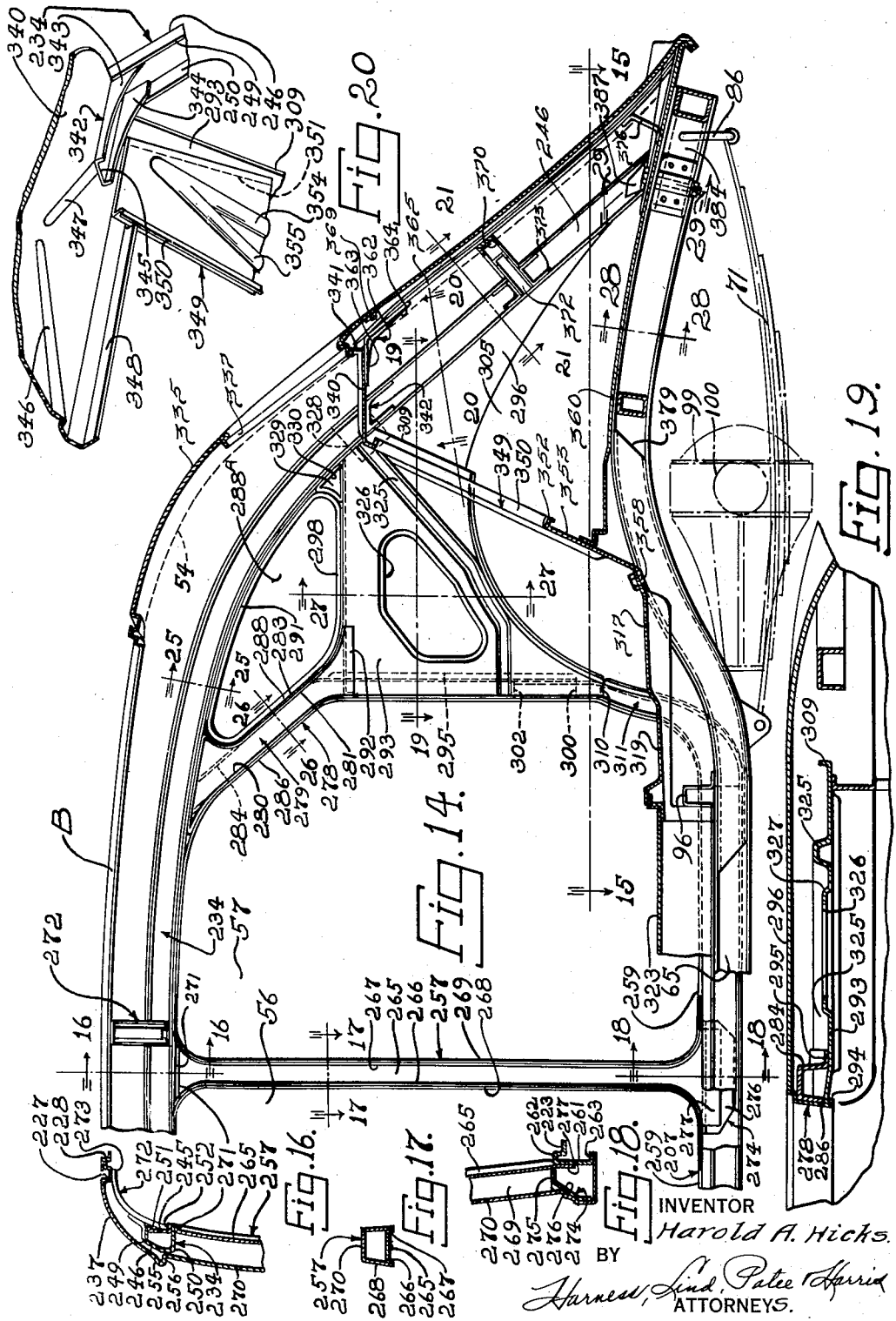

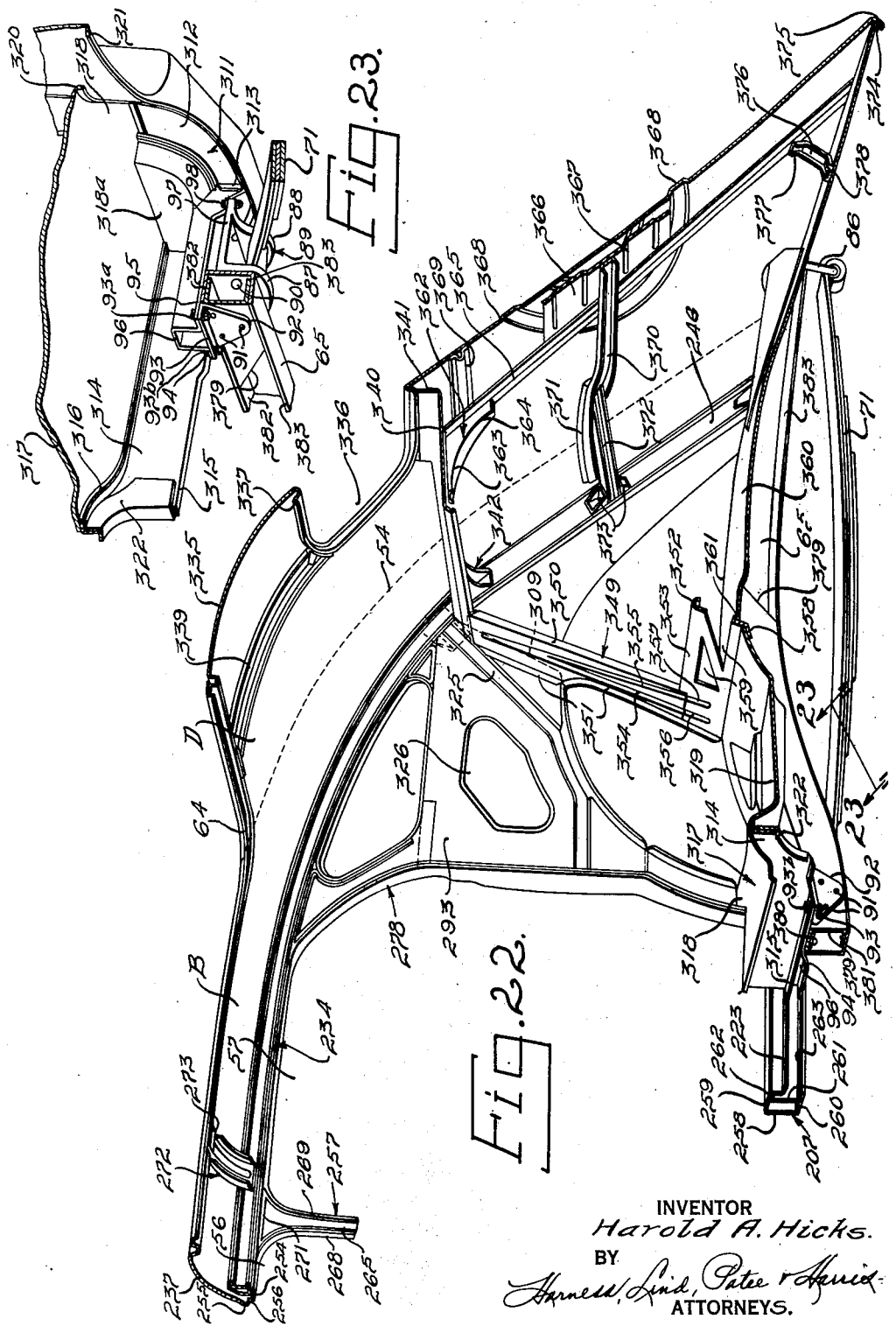

May 3, 1938.  H. A. HICKS  2,115,913
MOTOR VEHICLE BODY
Filed March 11, 1935  9 Sheets-Sheet 7

INVENTOR
Harold A. Hicks.
BY
Harness, Dind, Patee & Harris
ATTORNEYS.

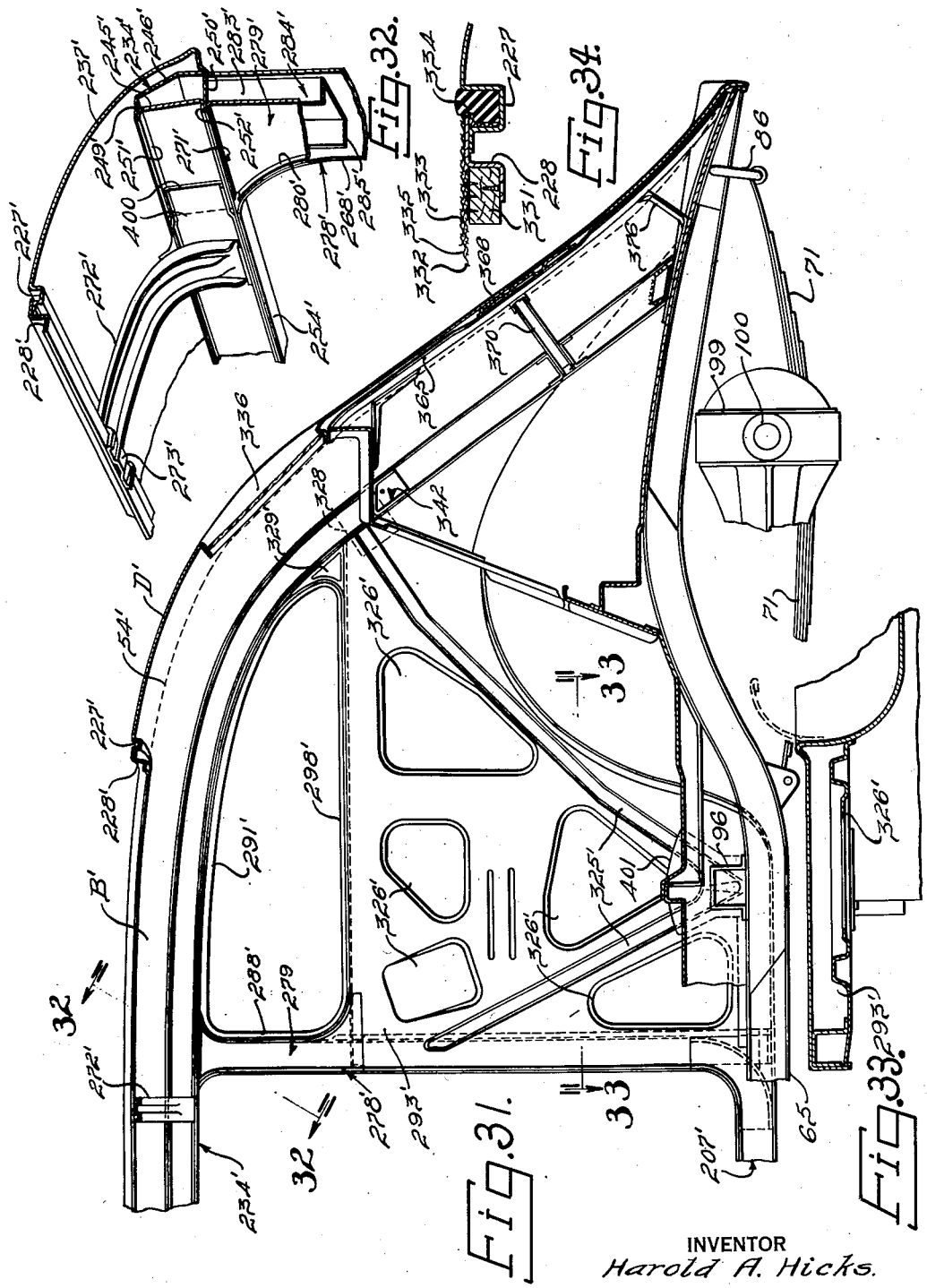

May 3, 1938.  H. A. HICKS  2,115,913
MOTOR VEHICLE BODY
Filed March 11, 1935   9 Sheets-Sheet 9

INVENTOR.
Harold A. Hicks.
BY
Harness, Dind, Patee & Harris
ATTORNEYS.

Patented May 3, 1938

2,115,913

UNITED STATES PATENT OFFICE 2,115,913

MOTOR VEHICLE BODY

Harold A. Hicks, Detroit, Mich., assignor to Chrysler Corporation, Highland Park, Mich., a corporation of Delaware Application March 11, 1935, Serial No. 10,422

55 Claims. (Cl. 296—28)

This invention relates to motor vehicles and refers more particularly to improvements in body structures of motor vehicles.

It is an object of my invention to provide a motor vehicle body structure having improved characteristics of strength and rigidity.

A further object of my invention is to provide a body structure fabricated in an improved manner from steel panels, steel rails, channels, braces and the like connected together to provide a substantially unitary rigid structure having improved strength and durability.

Another object of my invention in a more limited aspect thereof is to provide an improved body structure having the component parts thereof largely connected by welding.

Another object of my invention is to provide a body structure of relatively great strength and rigidity for the weight thereof.

Further objects of my invention are to provide a body comprising an improved truss-like structure; to provide a body structure fabricated in an improved manner to afford relatively great strength accompanied by improved stress distribution between the structural body parts, and freedom from rattle or wearing between the component body parts; and to provide an improved steel body structure adapted for manufacture at relatively low cost commensurate with the advantages obtained by reason of my construction.

An additional object of my invention is to provide a truss-like body structure adapted to efficiently distribute the stresses throughout the body incident to its weight and to the loads applied thereto from the ground wheels.

A further object of my invention in its more limited aspects is to provide a body structure fabricated in a novel manner from pre-formed, built-up, or assembled main body panels or sub-assembly units.

Further features of my invention relate to the provision of novel relatively strong, durable, and efficient joint structures or connections between the various component parts of my body structure; to the provision of improved means for utilizing the plates, panels, or shells of the body structure to carry a portion of the stresses; and to the provision of improved means for bracing the body parts.

Further objects and advantages of my invention will be more apparent from the following illustrative embodiments thereof, reference being had to the accompanying drawings, in which:

Fig. 4 is a sectional elevational view of the forward portion of the vehicle shown in Fig. 1, the section being taken along the line 4—4 of Fig. 3.

Fig. 5 is a detail sectional view through one of the forwardly extending hollow cowl beams, the section being taken along the line 5—5 of Fig. 4.

Fig. 6 is a detail sectional view along the line 6—6 of Fig. 4 illustrating the fabricated joint at the junction of the forward door column and instrument panel.

Fig. 7 is a detail perspective view of the joint shown in Fig. 6 looking from the inside of the body structure rearwardly and outwardly.

Fig. 8 is a detail perspective view illustrating the brace structure between the dash and instrument panel, the view being taken from inside the body structure looking forwardly and outwardly substantially from the line 8—8 of Fig. 4.

Fig. 9 is a detail sectional perspective view through the line 9—9 of Fig. 4 illustrating the structural connection between the front end of one of the front springs and the associated side sill or chassis member and the lower forward end of the hollow cowl beam associated therewith, the view looking from the outside toward the inside with parts broken away to illustrate the connection.

Fig. 10 is a detail sectional plan view along the line 10—10 of Fig. 4 illustrating the structural connection shown in Fig. 9 and further illustrating the frame structure rearwardly and laterally to substantially the centerline longitudinally of the vehicle body frame.

Fig. 12 is a detail perspective sectional view of the toe board supporting cross brace, the view being taken as generally indicated at 12—12 in Fig. 4.

Fig. 14 is a longitudinal central sectional elevational view of the rear portion of the body structure taken along the line 14—14 of Fig. 3.

Fig. 15 is a detail sectional plan view along the line 15—15 of Fig. 14.

Figs. 16, 17, and 18 are detail sectional views illustrating the structure of one of the intermediate side door columns, the views being respectively taken along the lines 16—16, 17—17, and 18—18 of Fig. 14.

Fig. 19 is a detail sectional plan view along the line 19—19 of Fig. 14 illustrating the bracing between the rear door column and the main top frame member.

Fig. 20 is a detail sectional perspective view taken as generally indicated by the line 20—20 of Fig. 14 looking upwardly and outwardly at the bracing for the rear seat transverse stiffening structure.

Fig. 21, on sheet 3, is a detail sectional view along the line 21—21 of Fig. 14 illustrating the rear panel structure.

Figure 3:
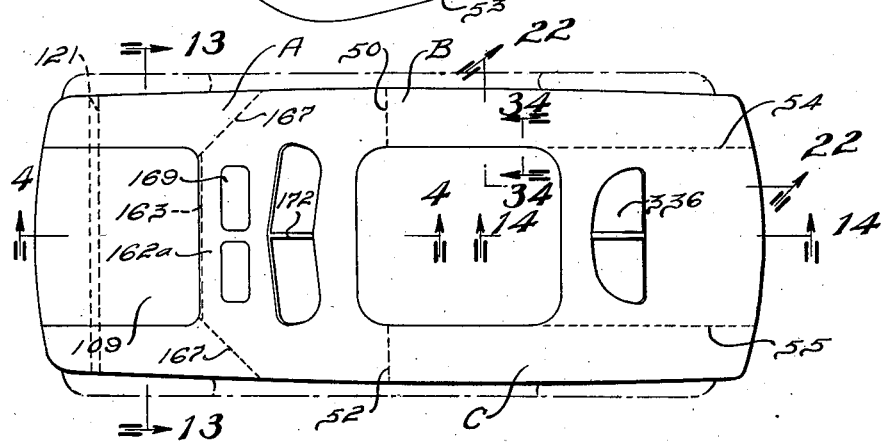
Fig. 3 is a top plan view of the vehicle shown in Fig. 1.

Fig. 22 is a sectional perspective view of a rear corner portion of the body looking from the inside as generally designated by the line 22—22 of Fig. 3.

Fig. 23 is a bottom perspective view of the forward suspension of the rear spring shown in Fig. 22, the view being taken as generally indicated by the line 23—23 in Fig. 22.

Figure 11:
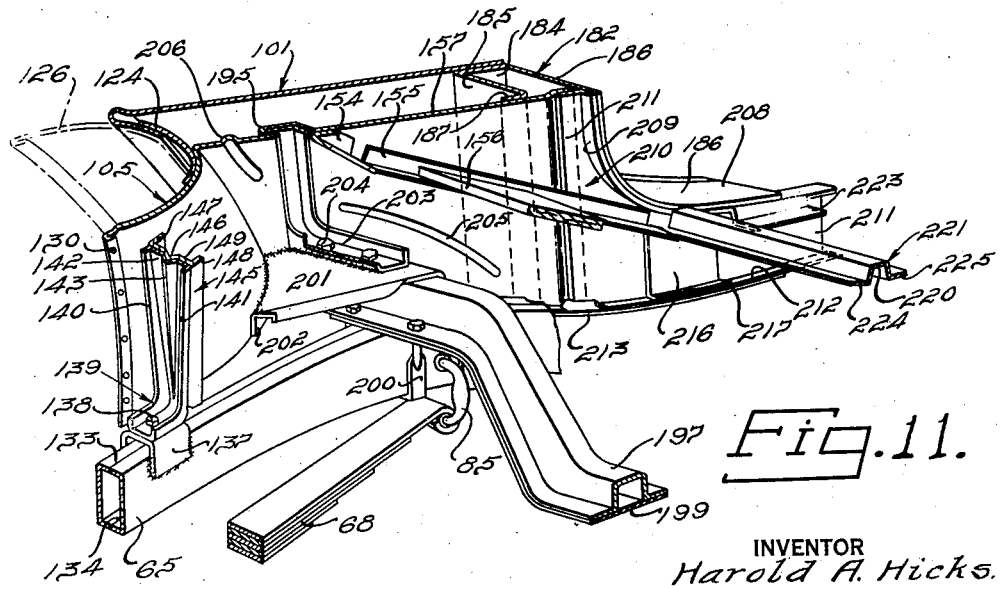
Fig. 11 is a detail sectional perspective view taken generally as indicated by the line 11—11 of Fig. 4 illustrating the structural parts associated with the rear of one of the front springs, chassis cross brace, and front door column.
Figure 24:
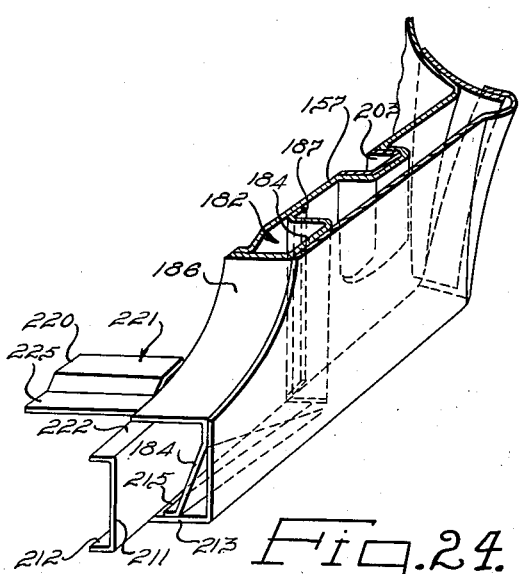

Fig. 24 is a detail perspective view illustrating the lower portion of the front door column and associated parts as shown in Fig. 11, the view being taken looking forwardly from the outside of the body structure.

Figs. 25 to 29, inclusive, are sectional detail views of the body structure shown in Fig. 14, these views being respectively taken along the lines 25—25, 26—26, 27—27, 28—28, and 29—29 of Fig. 14.

Figure 30:
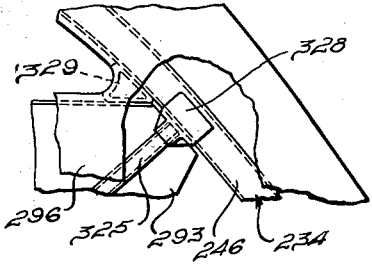

Fig. 30 is a detail side elevational view illustrating the joint between the main top frame member and the ribber panel rearwardly of the rear door column, the view being taken from outside the body with a portion of the outer panel broken away to illustrate the joint.

Fig. 31 is a view corresponding to Fig. 14 but illustrating the body structure for a two door vehicle, the structure illustrated in Fig. 31 being adapted to take the forward body structure illustrated in Fig. 4.

Fig. 32 is an inside detail perspective view of the joint between the upper main frame member and the door column shown in Fig. 31, the view being taken as generally designated by the line 32—32 of Fig. 31.

Fig. 33 is a detail sectional plan view between the door column and rear wheel housing shown in Fig. 31, the section being taken along the line 33—33 of Fig. 31.

Fig. 34 is an enlarged detail sectional view of the vehicle roof structure, the section being taken along the line 34—34 of Fig. 3.

Figure 35:
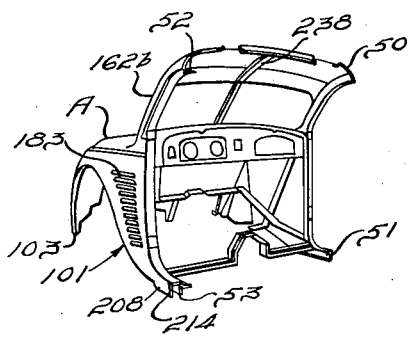

Fig. 35 is a perspective view of the body front section assembly.

Figure 36:
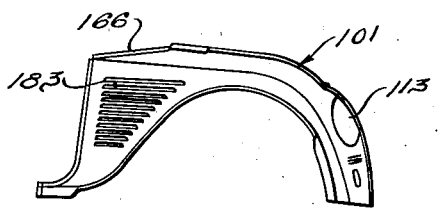

Fig. 36 is an inside view of one of the cowl side panel structures forming a part of the body front section of Fig. 35.

Figure 37:
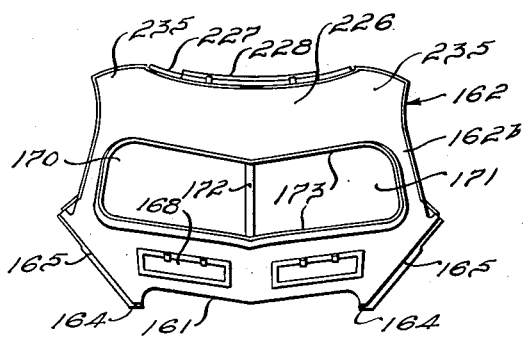

Fig. 37 is an inside view of the windshield cover assembly forming a part of the body front section of Fig. 35.

Figure 38:
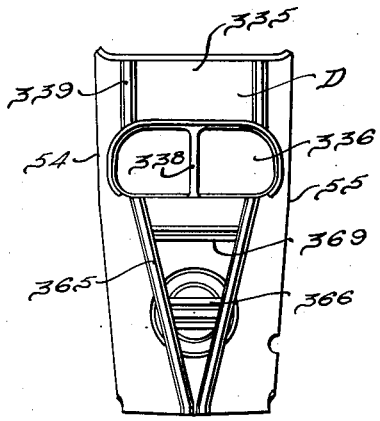

Fig. 38 is an inside view of the rear body panel for either the four door sedan type of body illustrated in Fig. 14 or the two door sedan type of body illustrated in Fig. 31.

Figure 1:
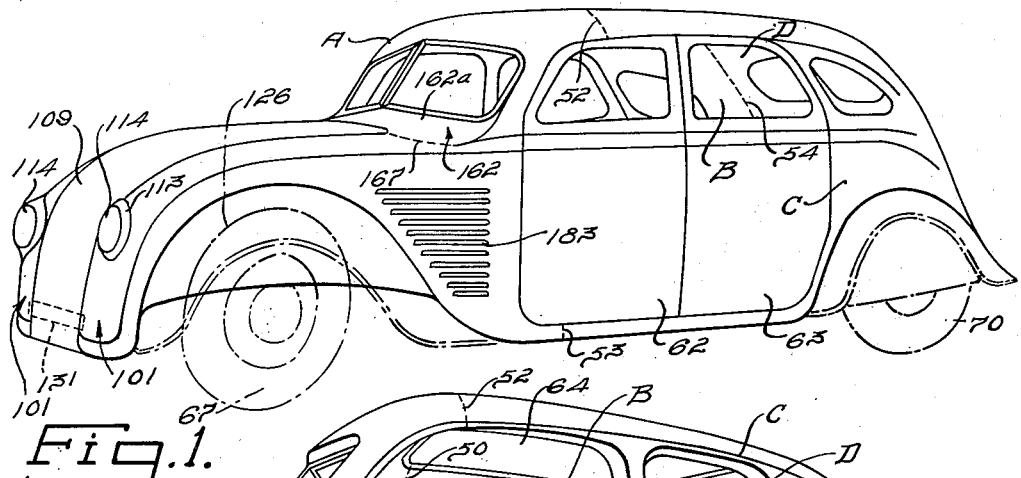
Fig. 1 is a front and side perspective view illustrating the general appearance of a four door sedan type motor vehicle constructed in accordance with my invention.
Figure 39:
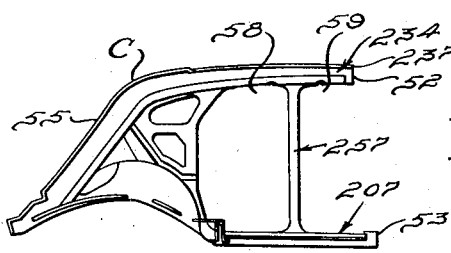

Fig. 39 is an inside side elevational view of one of the side panels for the four door body shown in Fig. 1.

Referring to the drawings, I have illustrated my invention in connection with a motor vehicle body of the enclosed type which, for a four door sedan, may have the general appearance in Figs. 1 and 3. It will be understood that, in its broader aspects my invention is not limited to any particular appearance, style or shape of the body or the motor vehicle as a whole as these may vary within wide limits according to preference.

My body structure is, in general, of all-steel unitary construction fabricated from steel panels, shells, or the like, pressed steel rails, channels, columns, plates and braces. The component parts are preferably for the most part welded into one unitary rigid structure of improved strength and durability. I prefer to largely weld the component parts of the body structure since, among other advantages, the welding provides permanence of assembly, relatively great strength accompanied by efficient stress transference between the welded parts, freedom from rattle or weaving between the various parts, and reduction in weight and manufacturing cost of the body structure as a whole.

In some instances, as will be presently more apparent, I have connected certain parts of the structure with rivets, bolts, or the like, particularly where removal of such parts for inspection, servicing or replacement renders the use of non-welded fastening means desirable. In other instances rivets or bolts are employed to facilitate the final assembly of certain main assemblies to other main structures and I desire to point out that, in the broader aspects of my invention, I do not limit my invention to the particular type of connecting means hereinafter more particularly described in order to illustrate one concrete form which my invention may assume, it being readily apparent that other fastening means may be employed as desired.

In general, according to the illustrated preferred embodiment of the principles of my invention, I have provided a body construction which is fabricated from a plurality of pre-formed, built-up or assembled main body panels or sub-assembly units although, if desired, the entire body structure may be fabricated or built-up without first providing the aforesaid pre-formed main panels or sub-assemblies and the like. I prefer, however, according to one novel feature of my invention to provide such pre-formed main structures as the manufacture, assembly, and servicing of the body structure is greatly facilitated thereby. In practice, these main panels or sub-assemblies may vary, as desired, both in the number of such main component panels or sub-assembly structures and in the formation of the structural parts thereof within keeping of the broader principles of my invention.

According to the illustrated embodiments of my invention, the body structure shown in Figs. 1 and 3 is preferably formed of four main structural portions adapted to be welded together to form a rigid unitary body structure, such main portions comprising the body front section A, the body side panels B and C, and the body rear panel D.

The front section A, as will be apparent from Figs. 1, 2, 3, 4, and 35 is connected by welding to the side panel B as generally indicated at 50 and 51 and to the other side panel C in a similar manner at corresponding points 52 and 53. The side panels B and C are connected by welding to the rear panel D along the downwardly meeting edges of the side and rear panels as indicated at 54 and 55 respectively.

It will be understood that the various welded joints do not appear when the finished body is viewed since the external welds are covered by the usual enamel-like paint and the internal welds which are not otherwise hidden from view by the body structure itself are covered by the interior trim and finish customarily employed in general body practice or else by paint or other finish panels as desired. My invention is more particularly directed to the body structure, and the details of the trim, finish and the like will, for the most part, be omitted from my disclosure. In practice, any type of welding may be employed which is best suited to the particular joint or connection dealt with and I have found it expedient to employ flash-welds, butt-welds, arc-welds, and gas-welds at different points in the structure.

Thus, by way of example, in the assembly the side panels B and C are flash-welded along the rear panel edge joints 54 and 55 and then joined in a unit to the front section A. Where the front section A meets the side panels B and C at the open ends, the header joints 50 and 52 at the top are flash welded on the outside and are welded on the inside. The lower ends 51 and 53 are gas welded on the outside and arc welded on the inside although I do not limit my invention in its broader aspects to welded connections or to any particular types of welds where this form of connection is employed.

Figure 2:
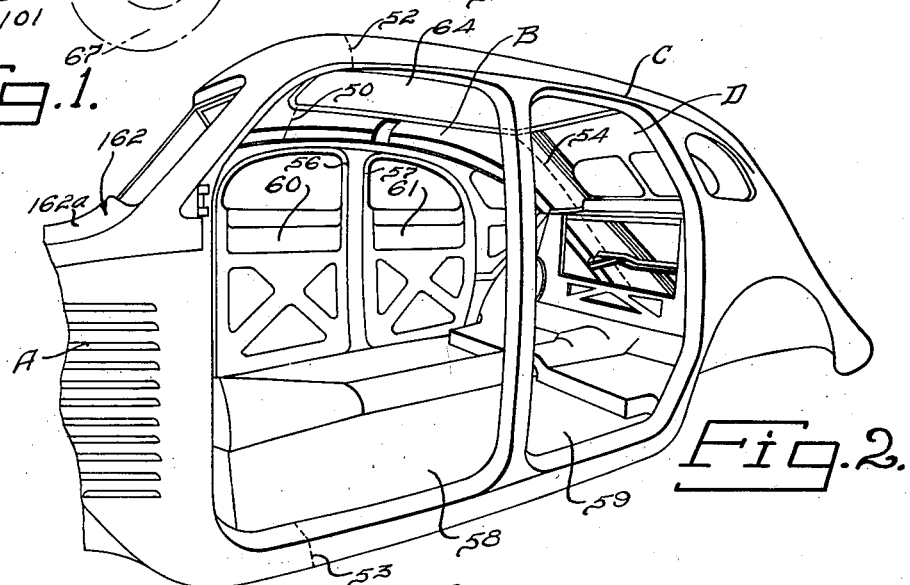
Fig. 2 is a side perspective view of the rear body portion of the vehicle shown in Fig. 1, the side doors, interior trim and seats being removed to illustrate the body structure.

The side panels B and C in the case of the sedan type of body respectively provide openings 56, 57 and 58, 59 for the doors 60, 61 and 62, 63, and the four main body assemblies A, B, C, and D together provide the roof opening 64, best seen in Fig. 2. This roof opening is filled in with a cover structure illustrated in Fig. 34 and hereinafter referred to in detail.

While, within the broader aspects of my invention, the body structure may be directly supported as a rigid unit by the vehicle road wheels with appropriate springing intermediate the wheels and body, I prefer according to the illustrated embodiment of my invention to provide a vehicle chassis including the main side rails or sills 65, 66 (see Fig. 13) and cross members hereinafter referred to in detail. This chassis structure is relatively light in weight and is provided primarily to facilitate the manufacture and assembly of the motor vehicle whereby the chassis may be assembled and the body structure assembled independently thereof as a separate unit. The body assembly may then be conveniently mounted on the chassis assembly as will be presently more apparent.

The chassis side rails 65 and 66 are tension members and are adapted to transmit a portion of their load in a novel manner to the body structure, the latter receiving the major portion of the total load directly at the points of body support for distribution of the stresses throughout the truss-like body structure.

Thus, each front steering ground wheel 67, one of which is shown in Fig. 1, is sprung in any desired manner as by the leaf spring 68 associated with the front axle 69 as shown in Fig. 4. These springs 68 are respectively connected to the chassis rails 65 and 66 at the forward and rear ends preferably at or close to points where main compression members of the body frame join the chassis rails whereby the major portion of the stresses passes directly to the body structure. Likewise the rear driving ground wheels 70, one of which is shown in Fig. 1, are connected through rear supporting springs 71 shown in Figs. 14, 21, and 23 to the chassis rails 65 and 66 at or adjacent to points of load distribution to the body structure. Other well-known or suitable forms of wheel springing may be employed as desired within keeping of the spirit of my invention.

Referring now to Figs. 4, 9, 11, and 13, I will describe the details of the connections between one of the front springs 68 and the chassis frame, it being understood that the body and chassis structures are for the most part symmetrical about the longitudinal vertical central plane through the vehicle. The forward end of spring 68 as best seen in Fig. 9 is pivoted to a supporting shackle bolt 72 carried between the spaced downwardly extending flanges 73 of the shackle bracket 74. This bracket has an upwardly extending body portion 75 fitting within the front terminal end portion of the chassis rail 66, the latter being inverted U-shaped at this point. Overlying the chassis rail is a saddle bracket 76 flanged at its outer lower end 77 for connection by one or more bolts 78 to the bracket 74.

Welded to the upper face of the saddle bracket 76 is a channeled connector member 79 provided for this purpose with an inwardly extending seating flange 80. The member 79 also has inwardly extending longitudinally spaced stiffening flanges 81 and 82, and the intermediate web 83, the member 79 extending generally upwardly and rearwardly to transmit load from the shackle bracket 74 through the upwardly and rearwardly extending hollow cowl beam structure as will be presently more apparent. The member 79 is rigidly secured in place by a plurality of fastener bolts 84 which pass through the flange 80, saddle bracket 76, chassis rail 65 and then enter the body portion 75 of the shackle bracket 74 for anchorage therein. The vertical side flanges of the bracket 76 extend forwardly around the front ends of the body portion 75 and rail 65.

Rearwardly of the front of the front spring connection, the chassis side rails are rectangular in cross section as shown in Fig. 11 in connection with the rail 65. In this figure the rear suspension for one of the front springs 68 is shown, the suspension comprising a swinging shackle 85 supported by the rail 65 and mounting the usual spring eye at the rear end of the spring 68.

The typical rear spring 71, best shown in Figs. 14, 22, and 23, has its rear end supported from the rear end portion of the chassis rail 65 by a swinging shackle 86, the forward end, as best seen in Fig. 23, being mounted between the downwardly extending flanges 87 and 88 of the shackle bracket 89. This bracket has its flange 87 bolted at 90 to the rail 65. Riveted at 91 to the inner face of rail 65 is a bracket 92 having an inwardly bent flange 93 lying in the plane of the upper surface of rail 65.

Overlying the flange 93 and rail 65 and bolted thereto at 93ᵃ and 93ᵇ are the oppositely extending flanges 94 and 95 of the inverted U-shaped transversely extending connector member 96. The shackle bracket 89 has an upper web 97 secured to and beneath the flanges 94 and 95 by fasteners 98, the connector member 96 extending outwardly therebeyond for load transference connection with the body structure as will hereinafter be more apparent. In Fig. 14 I have diagrammatically illustrated the differential housing 99 and rear axle 100, the latter extending in customary manner for support by the springs 71 for driving the rear ground wheels 70.

Returning now to the details of construction of the body front section A best shown in Fig. 4 and the detailed sectional views noted thereon, this front section comprises a pair of stamped sheet metal cowl side panels 101 one of which is shown by itself in Fig. 36. These cowl panels form the outer panel shell or metallic skin of the engine enclosure (the engine not being shown) or hood structure forwardly of the transverse dash 102. The cowl panels 101 also form one member of the respective hollow cowl beams for the front body section in the following manner The typical right cowl panel 101 illustrated in Fig. 4 has a forward downwardly extending terminal portion flanged inwardly at 103 to strengthen the lower edge and to nest with a similar flange 104 of the inner cowl panel or shell member 105, these flanges being welded together. The shell 105 is welded to the outer surface of the web 83 of bracket 79 and has an opening 106 to receive the downwardly extending end of the stiffener channel 107 which is welded to the outer vertical side face of the saddle bracket 76 as best seen in Fig. 9. Above the opening 106 the channel 107 is welded to the shell 105 within the hollow cowl beam formed by panel 101 and shell 105.

The inner and upper marginal edge of each cowl panel 101 is return bent to provide a channeled shelf 108 for supporting the hood cover 109 adapted to pivot at its rear opposite sides by pivot bearings, one of which is shown at 110 in Fig. 4, carried by a bracket 111 welded to the inner surface of the shell 105.

The upper marginal edge of the shell 105 is bent at 112 to nest with panel 101 adjacent the shelf 108, the engaging surfaces being welded.

Each of the panels 101, as best shown in Figs. 1 and 36, is provided with an opening 113 adapted to accommodate a headlight structure 114. The shell 105 may be provided with suitably located openings 115, 116, 117, and 118 adapted to lighten the weight of the hollow cowl beam without materially lessening its strength.

Secured to the shells 105 are the substantially vertically extending stiffener channel members, one of which is shown in Fig. 4 at 119. Each channel member carries a bracket 120 and a channeled cross brace 121 connects the opposite brackets 120 as shown in Fig. 3 to tie the opposite cowl beams together adjacent the forwardly extending ends thereof and thereby increase the rigidity of the forward portion of the front section A. The brace 121 is also adapted for connection to the engine cooling radiator (not shown). For convenience of manufacture, the cowl beams may each be formed in two sections welded together forwardly of the cross brace 121 as indicated at 122 in Fig. 4.

To complete the substantially triangular hollow cowl beam and to provide a housing for a front wheel 67, each cowl panel 101 has its other marginal edge turned inwardly to provide a flange 123 engaging the arched panel 124. This panel is connected at circumferentially spaced points to flange 123 by fasteners 125 which also connect the front wheel fenders 126 to the respective hollow cowl beams. The opposite or inner marginal edge of each arched panel 124 as best seen in Fig. 5, underlies the inwardly deflected lower arched portion 127 of the shell 105 and is welded thereto. The lower edges of the fender 126 and the arched portion 127 are respectively return bent at 128 and 129 to reinforce these members, the edge 129 having a series of holes 130 adapted to removably accommodate a downwardly extending cover plate (not shown).

In Figs. 9 and 10 I have illustrated a further reinforcement for the lower ends of the hollow cowl beams comprising a channeled sheet metal brace 131 which has its opposite ends welded to the inner terminal edges of the panel 101 and the shell 105 forming each cowl beam. This brace 131 rigidly ties together the lower ends of the cowl beams and reinforces the front lower end of the front section A.

The forward portions of the side rails 65 and 66 are formed in rectangular shape by welding together complementary channel sections, the welds 133 and 134 being indicated in Fig. 11. Where the rails receive the body portions 75 of the shackle brackets 74, the lower flanges of the component rail channels are omitted. The forward ends of the chassis rails 65 and 66 are braced by a cross member 135 rendered more rigid by the corner angle braces 136, these parts being welded in place.

By removing the fasteners 78 and 84 it will be apparent that the front end of the body structure may be removed from the chassis rails 65 and 66, such condition being desirable to facilitate ready assembly and disassembly of the body on the chassis, and, as heretofore noted, the body structure may be removed from the connection at the front ends of the rear springs 71 (see Fig. 23) by reason of the fasteners 93ª, 93ᵇ and 98.

It will be apparent that the hollow cowl beams, best seen in cross section in Fig. 5, present rigid main compression beams or columns which are loaded at their lower ends at the respective shackle brackets 74, the component panel and shell members receiving the load directly from the front ends of the front springs 68 for transmission through the upwardly and rearwardly curving cowl beams to distribute the stresses through the body structure as will be presently apparent.

Welded to the chassis rails 65 and 66 at points respectively adjacent the rear of the associated front wheel house structure is a channeled bracket or seat 137 to which is removably secured by fastener 138 an upright reinforcing member 139 as best seen in Figs. 4, 10, 11, and 13. Each upright 139 is channeled longitudinally thereof for strength, the two flanges 140 and 141 being connected by the web 142 which is ribbed at 143 to further stiffen the upright.

Figure 13:
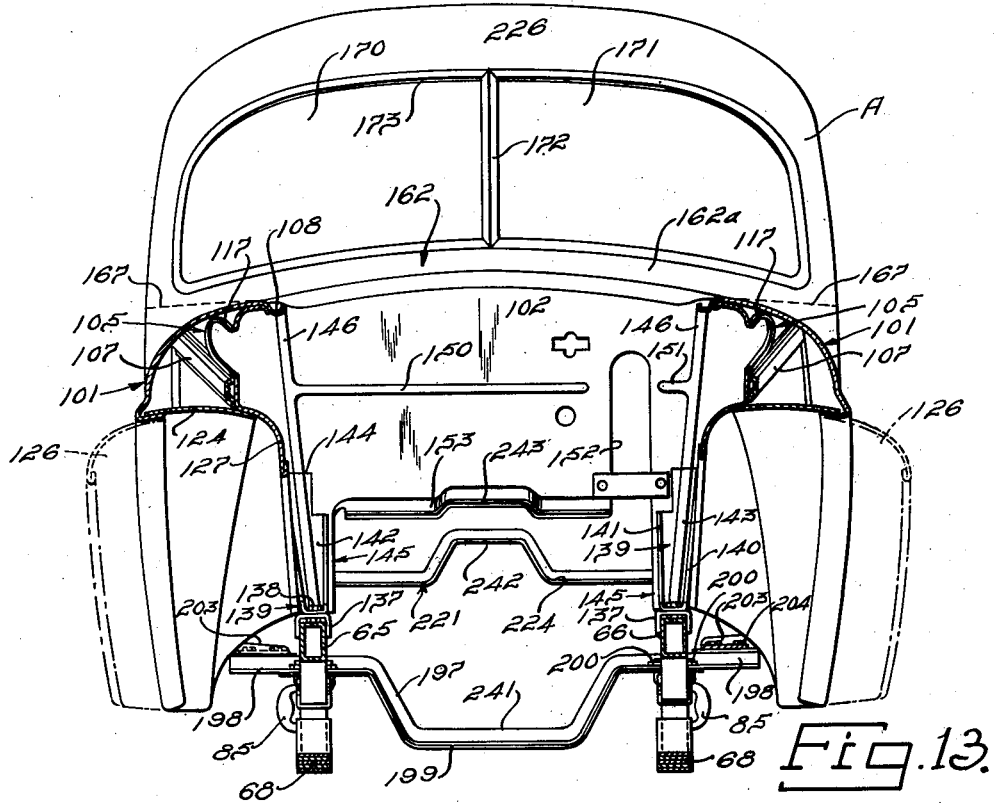
Fig. 13 is a sectional elevational view taken along the line 13—13 of Fig. 3 transversely through the forwardly extending frame structure.

The flange 140 is welded to the portions of the shell 105 adjacent thereto, each upright 139 terminating at the stepped upper edge 144 seen in Fig. 13. Welded to the rear face of the web 142 is a reversely channeled downwardly extending foot portion 145 of the dash 102, each foot 145 being ribbed at 146 to nest with the associated rib 143 of an upright 139. The foot 145 thus has rearwardly extending flanges 147 and 148 connected by a web 149 which is welded to the web 142 along the length thereof. Each flange 147 is also welded to the associated shell 105, thus rigidly bracing the rear portions of each front wheel house structure and securely tying these structures to the dash 102 which acts as a transverse brace for the front section A at the region of the rear of these wheel house structures. It will furthermore be apparent that the uprights 139 and their associated dash foot extension 145 provide a rigid beam or column bracing the wheel house structures and the dash with the chassis frame or rails 65 and 66.

The reinforcing ribs 146 extend upwardly beyond the upper margins 144 of the respective uprights 139 to reinforce the dash 102 substantially for the full vertical height thereof, the vertical ribs 146 being provided with lateral dash stiffening ribs 150 and 151 (see Fig. 13) interrupted to provide an opening 152 in the dash to accommodate the vehicle steering wheel post (not shown).

The lower edge of the dash 102 has a rearwardly and downwardly bent marginal flange 153, best seen in Fig. 4, adapted to cooperate with angled brackets 154 and 155 rearwardly at each side of the dash to provide a support for the vehicle toe boards. A portion of these toe boards is shown in Figs. 10 and 11 at 156. These brackets 154 and 155, as best seen in Figs. 4 and 11, are welded to the rear column forming extensions 157 of the shells 105 on each side of the body structure.

The upper part of the dash panel 102 above the ribs 150 and 151, as shown in Figs. 4 and 8, slants rearwardly to each side of the central portion thereof and terminates laterally in rearwardly extending side flanges 158. These side flanges also extend below the ribs 150 and 151 and are welded to the inner surface of the side extensions 157 or shells 105.

The upper marginal edge of the dash panel 102 is bent forwardly at 159 and then downwardly at 160 to stiffen the dash panel and also for welding to the inner surface of the inwardly return bent edge 161 of the windshield and cowl forming panel 162 best shown in Fig. 37. Thus, the panel 162 has a cowl portion 162ª which is welded to the dash panel along the dotted line 163 shown in Fig. 3, the cowl portion 162ª having forward projections 164 and adjoining rearwardly slanting edges 165 adapted for welding to the adjacent edges 166 (see Figs. 8 and 36) of the side panels 101, the weld joint being designated at 167 in Figs. 1, 3, and 13. From Fig. 37 it will be noted that the cowl portion 162ª has ventilator openings 168 adapted to be adjustably covered by covers 169 shown in Fig. 3.

The portion of the panel 162 extending rearwardly and upwardly from the cowl portion 162ª provides the windshield frame forming portion 162ᵇ best shown in Fig. 37. This portion 162ᵇ has a glass receiving opening divided into portions 170 and 171 by a brace 172 welded at its upper end to the glass supporting marginal flange 173 bounding the openings 170 and 171. At its lower end this brace is welded to the rear of the cowl portion 162ª and to the inwardly extending front marginal flange 174 of the shelf portion 175 of the instrument panel 176. The flange 174 is welded to the lower portion of the flange 173 and the instrument panel 176 has a stiffening return bend 177 at the rear of the shelf portion 175.

In order to brace the upper ends of the dash panel 102 and the instrument panel 176 longitudinally of the body and also to further support the cowl portion 162ª, I have provided a channeled brace 178 at each side of the body, these braces extending rearwardly beneath the cowl portion 162ª respectively from the aforesaid projections 164.

One of these braces 178 is shown in Figs. 4 and 8 as having its web extended forwardly at 179 for welding to the forwardly bent edge 159 and to the adjacent edge 161 of the cowl portion 162ª at one of the aforesaid projections 164 thereof.

The channeled brace 178 extends rearwardly spaced beneath the cowl portion 162ª to receive the anti-rattle material such as the felt block 180 therebetween. The brace 178 terminates rearwardly in a web extension 181 which conforms with and which is welded to the rear face of the flange 173 as seen in Fig. 4.

The channeled shelf 108 (Fig. 5) of each outer panel 101 terminates rearwardly thereof at the respective cowl projections 164 where the parts are welded together, the flanged edge 112 (Fig. 5) of the inner shell 105 extending rearwardly of the dash panel 102 for welding to the adjacent flange of the channeled brace 178 as best seen in Fig. 8. The brace 178 thus, in effect, provides a continuation, rearwardly of the dash, of the channeled shelf 108 and serves to distribute the stresses rearwardly from shelf 108 to the cowl portion 162ª and to the instrument panel 176. Furthermore, it will be noted that the rib 146 of the dash panel 102 is associated with the aforesaid welded structure at each cowl projection 164 thereby further adding rigidity to the assembly illustrated in Fig. 8.

As best seen in Figs. 6, 10, 11, 35, and 36, the outer panel 101 extends rearwardly along each side of the front section A from the rear of each front wheelhouse structure to the front door columns 182. Referring to a typical side of the body structure, the outer panel 101 is provided with louvres 183 for the circulation of air from the engine enclosure.

The rear vertical edge portion of the outer panel 101 is welded to the vertically extending web portion 184 of the front door column 182. This web portion 184 has the front and rear inwardly extending column forming flanges 185 and 186 respectively, the flange 185 terminating in a forwardly extending secondary flange 187 which is welded to the rearwardly extending panel portion 157, the latter panel portion extending rearwardly beyond the flange 187 to provide the inner wall of the column 182.

At the portion of columns 182 adjacent the sides of the instrument panel 176, each column inner wall has an inwardly struck flange 188 leaving an opening 189, best seen in Fig. 6. Welded to flange 186 within each column 182 is a bracket 190 which is stepped forwardly for welding to the flange 188, the bracket extending through opening 189 for welding to the side edge portion of the instrument panel 176. Thus, the instrument panel is rigidly secured to the column 182.

Above the instrument panel the column 182 slopes rearwardly and upwardly, the inner wall of the column above the panel 105 being formed by the channeled column insert 191 welded in place and also to the inwardly overlapped upper end portion of a stiffener plate 192 which, as best seen in Fig. 7, is welded to the panel portion 157 and is enlarged at its lower end to provide an inner reinforcing cover plate for the relatively large recess 193 formed in the panel portion 157 at the intersection of the outwardly pressed channel ribs 194 and 195.

The channeled rib 194, as best seen in Figs. 4, 6, and 7, nests within the rear end of the aforesaid stiffener channel 107 and thus constitutes a continuation of the channel 107 to the column 182, the overlapping portions of the channel 107 and the rib 194 being welded together. As shown in Figs. 6 and 7 the rear edge of the panel portion 157 is flanged at 196 for welding to the inner edge portion of the flange 186.

The typical channel rib 195, shown in Figs. 4, 10, and 11, extends downwardly and forwardly to the channeled cross member 197, the latter extending laterally beyond the side rails 65 and 66 as indicated at 198 in Fig. 13. The cross member is reinforced by a bottom plate 199 welded thereto and at each of the side rails the cross member 197 is removably secured thereto by a pair of U-bolts 200 which pass beneath the side rail and then upwardly through the side flanges of the cross member 197 and the plate 199.

The cross member 197 is fabricated into the body structure by reason of the shear plates 201 welded to the upper face of the cross member at opposite sides thereof, each shear plate having a marginal stiffening flange 202 forming with and welded to the curved wheel house portion of shell 105 associated therewith as shown in Fig. 11. Other flanges stiffen the inner margin of the shear plate, the rear margin adjacent the cross member 197, the outer marginal flange being welded to the panel portion 157.

Welded to the upper face of each shear plate 201 is a channeled angle bracket 203 which has an upwardly extending arm portion nested within and welded to the pressed rib 195. Each angle bracket 203 and associated plate 201 is removably secured by bolts 204 to its associated projecting portion 198 of the cross brace 197. As shown in Figs. 4 and 11 the panel portion 157 is provided with outwardly pressed stiffening ribs 205 and 206 lending rigidity to the panel.

By reason of the foregoing structure, I have provided for a transference of a part of the stress in the side rails 65 and 66 to the body frame structure adjacent the load point at the side rails where the rear of the front springs 68 are suspended by the shackles 85. This transference of the load to the body structure takes place through the shear plates 201 to the shells or panels 105 for distribution to the body structure by the columns 182 and also by the feet 145 and dash 102; also directly upwardly through braces 203 and associated channeled ribs 195 which, as best seen in Figs. 4 and 7, tie into the upper sloping portion of the columns 182. The ribs 195 and the forwardly extending hollow cowl beams including the associated stiffener channels 107 provide a truss-like structure in association with the side rails 65, 66 and the front door columns 182, the trussed body structure being further braced by the dash panel, instrument panel, the main shells or panels 101 and 105 and by the various structural organizations hereinbefore described in detail.

Each column 182 extends downwardly and rearwardly where the column is fabricated with the forwardly extending end of the body lower side rail 207 of each side panel B and C to rigidly join the front section A to the side panels at the aforesaid connections 51 and 53.

The typical column fabrication, best shown in Figs. 4, 10, 11, 12, and 24, is provided by curving the flange 186 of the column rearwardly to form the top of the rearwardly extending column side rail portion 208. Welded to the inner margin of the flange 186 is the curving flange 209 of the corner brace 210, the latter having a web portion 211 overlapping the rear vertical edge of the panel portion 157 and welded thereto. The web portion 211 extends rearwardly to provide the inner web of the side rail portion 208, the lower edge thereof being flanged at 212 for welding to the lower flange 213 which extends forwardly beyond the brace 210 as a part of the outer shell or panel 101, the vertical portion thereof having the lower rearwardly extending rail wall forming projecting web 214 best seen in Figs. 12, 24, and 35.

From Figs. 12 and 24 it will be apparent that, at the rail portion 208, the web 184 angles across the interior of the rail portion for welding by a flange 215 to the flange 213 to additionally strengthen the rail portion at the region of connection to the side panel.

The web portion 211 of the brace 210 has a channeled supporting bracket 216 welded thereto, the lower flange 217 of the bracket being welded to the flange 212 and the upper flange 218 being channeled at 219 for receiving one lateral end of the complementary channeled portion 220 of the cross brace 221, these parts being welded together.

Rearwardly of the cross brace 221 the web 211 has a flange 222, shown in Fig. 12, welded to the side rail portion 208, the flange 222 terminating inwardly of the rail portion in the dropped flange or shelf 223 adapted to support the transversely extending floor boards 223ª, (see Fig. 10), the forwardly and rearwardly extending flanges 224 and 225 also supporting the adjacent floor boards 223ª and 156 as will be readily understood.

At each side rail portion 208 it will be noted that the web 211 extends rearwardly beyond the rear edge of the side rail portion 208 thereby forming a longitudinally overlapping welded joint with the side rails 207 of the side panels B and C. A joint of this character insures a rigid connection between the front section A and the side panel structures.

Referring now to the upper rear portion of the front body section A which has not yet been described in detail, it will be noted from Figs. 4, 13, and 37 that the windshield panel 162 has the panel portion 226 extending upwardly and rearwardly from the glass supporting marginal flange 173 to the return bent channeled transverse marginal rib 227 to which is welded the transversely extending roof supporting frame bracket 228.

Welded to the inner side of the panel portion 226 is a header brace 229 which reinforces the marginal flange 173 and the windshield panel, this header brace having terminal side webs 230 bent within the respective columns 182 around the inner portions of the column insert 191, the latter each having a reduced portion 231 shown in Fig. 4 for accommodating the associated web 230. The webs 230 are each welded to the column insert 191 and to the other portions of the column structure which contact therewith, the insert 191 terminating at 232 forwardly of the end of the main portion of the column which ends at 233, thereby also providing an overlapping welded joint for the forwardly projecting ends of the body upper or top rails 234 of each side panel B and C. The respective overlapping joints have been previously designated generally at 50 and 52.

The panel portion 226 has upper rearwardly extending side wings 235 which terminate rearwardly in flanges 236 adapted to accommodate the forwardly extending panel portion 237 of each of the side panels, the flanges 236 positioning the panel portions 237 in the plane of the associated wing 235 so that these panels may be welded and finished to provide a substantially uninterrupted and smooth exterior finish.

The columns 182 are welded to the inner marginal portions of their associated wing portions 235 and downwardly therefrom adjacent the windshield frame forming portions 162ᵇ as best shown in Figs. 4 and 35.

Forming an upper extension of the windshield brace 172 is a further stiffener brace 238 which reinforces the windshield panel 162, this stiffener brace extending from a welded connection at 239 and 240 at the header brace 229 to welded connections to the rib 227 and the roof frame bracket 228, the brace 238 thereby tying the structure forming the roof opening 64 in with the header 229.

The motor vehicle power plant, which ordinarily includes the engine, clutch and transmission (not shown) are supported over the front axle 69 by the aforesaid cross member 135 and by the cradled or dropped portion 241 of the cross member 197, the cross brace 221 and the dash flange 153 being respectively provided with arched central portions 242 and 243 to accommodate the rearwardly extending driving propeller shaft (not shown) leading to the aforesaid differential housing 99.

From Fig. 10 it will be noted that the chassis rail 65 extends rearwardly of the front wheel housing, the side rail being spaced inwardly from the associated front door column and its lower side rail extension 208, the chassis rail in the vicinity of the cross brace 221 assuming an inwardly opening single channel section instead of the rectangular section forwardly of cross brace 221 as shown in Fig. 13. The weld seam 133 is thus shown in Fig. 10 as merging at 244 with the widening upper and lower inwardly extending flanges of the chassis rail 65, it being understood that the chassis rail 66 is similarly constructed. Thus, the chassis rails 65 and 66 may be made lighter in weight rearwardly of the front door columns where the stresses are largely transmitted upwardly through these columns and along the body top rails 234.

I have now described the details of construction of the front body section A which may be fabricated as a unitary structure adapted for welding connection to the side body panels B and C, it being understood that while, in many instances, I have described the structural details of only one side of the front structure, both sides are preferably similar.

The body right side panel B is similar in construction to the left side panel C and, for the most part, the description will therefore be limited to one of these panels.

Thus, referring to the typical side panel B, best shown in Figs. 14 and 22 and the detail views noted thereon, the hollow top rail 234 projects forwardly for welding with the upwardly rearwardly extending end of the front door column 182 to provide a substantially continuous main compression member which, as will be presently apparent, continues rearwardly and downwardly to the rear end of the associated main chassis rail 65, thereby forming the main upper compression member of the trussed body structure.

The top rail 234 has an inner channel member 245 and an outer channel member 246, the inwardly extending upper and lower flanges 249 and 250, respectively, of the outer channel 246 being welded to the corresponding relatively short flanges 251 and 252 of the inner channel 245. The inner and outer channels are thus spaced laterally of the body to form the rigid hollow top rail 234.

At its forward end, the inner channel 245 is reduced in height at 253 to telescope into the main portion of column 182 which ends at 233 and also into the column insert 191 which ends at 232 (see Fig. 4), these parts being securely welded together.

The aforesaid panel portion 237 has its lower marginal edge bent inwardly at 254 for welding beneath the flange 252 (see Fig. 22) and adjacent the weld the panel portion 237 has a return bend 255 to provide the door receiving recess 256 which continues along the outer edges of the front door column 182 and the intermediate column 257.

The upper inwardly extending marginal edge of the panel portion 237, is constructed to provide a continuation of the roof opening 64 with the same return bent rib 227 and frame bracket 228 which were previously referred to in connection with the panel portion 226 of the windshield panel 162.

At the bottom of panel B, the lower side rail 207 has its outer channel member (see Fig. 22) formed with the web 258 and the inwardly extending flanges 259 and 260, the forward end of the side rail 207 overlapping the rearwardly extending end of the web 211 and flanges 212, 222, and 223 associated therewith. The webs 214 and 258 are thus welded together so that, in effect, the web 214 is extended rearwardly and likewise the flanges 213 and 186 are continued by the matched flanges 260 and 259 respectively, the inner edge portions of flanges 259 and 260 being welded to the overlapped portions of flanges 222 and 213 respectively, as will be apparent from Figs. 4, 22, and 24.

The side rail 207 has its inner channel member formed with the web 261 and the inwardly extending flanges 262 and 263 welded to the corresponding flanges 259 and 260 of the outer channel member, thereby forming a strong, hollow and very light rail structure. At the forward end of the lower rail 207, the inner channel member is reduced in height and deflected inwardly at 264 (see Fig. 4), the web 261 being welded in overlapping relation to the inner face of web 211 and likewise flanges 262 and 263 are respectively welded within and to flanges 222 and 212, these welded webs and flanges rearwardly of the deflected portion 264 preserving the continuity of the outer walls of the rail forming structure terminating rearwardly as shown in Fig. 24. The floor supporting shelf flange 223 is also continued rearwardly in the lower rail 207 as shown in Figs. 4 and 22.

The intermediate column 257 extends vertically between the top rail 234 and the lower rail 207 and provides a vertical brace member of the truss structure, this column being hollow and comprising inner and outer welded channel members best shown in Fig. 17.

The inner channel member has a web 265 which is transversely corrugated or ribbed for additional rigidity, the web having inwardly extending front and rear flanges 266 and 267 welded to and within the marginal portions of front and rear flanges 268 and 269 of web 270, the latter comprising the outer channel member of the column.

At its upper end, the column 257 is flared forwardly and rearwardly and has its outer web 270 formed integrally with or welded to the panel portion 237 as shown in Fig. 16 while the inner web 265 is bent inwardly at 271 for welding to the under face of flange 250 along the inner edge portion thereof. The flange 268 flares upwardly and forwardly at the top of the column and continues forwardly to form the aforesaid flange 254 of the panel portion 237 (see Fig. 22). Likewise the flange 269 flares upwardly and rearwardly to continue the flange 254 rearwardly of the column 257.

The panel portion 237 and the roof supporting structure 227, 228 is reinforced and braced from the top rail 234 at suitable points along the top rail, one of these braces being shown at 272 in Figs. 14, 16, and 22. This brace is formed of a channeled member welded at its lower end to the flange 252 and having an upwardly extending terminal tongue 273 welded to the under side of the rib 227 as best shown in Fig. 16.

The lower end of the column 257 is welded to the body side rail 207 as shown in Figs. 14 and 18. At the column junction the flange 259, forwardly and rearwardly of the column, flares toward the column as shown in Fig. 14 to form the column flanges 268 and 269. The space thus left is occupied by an insert 274 which has an upper inwardly bent flange 275 bridging the flange 259 at the points where this flange begins to flare upwardly. The insert 274 has a web 276 welded to the portion of web 270 which extends laterally in opposite directions to form the web 258 of the outer channel member of the rail 207. The web 265 has a downwardly extending tongue 277 which is substantially the width of the column bottom flare, this tongue being welded to the web 261 within the hollow rail 207. It will thus be noted that the column is rigidly joined to the rail 207, the continuous panel forming the column web 270 and the rail web 258 being reinforced by the insert 274 which bridges the bottom of the column and serves to connect the flanges 259 across the bottom of the column where the flanges 259 flare upwardly to form the column flanges 268 and 269.

Rearwardly of the intermediate column 257 the panel B has its top rail 234 continuing downwardly around the rear of the rear wheel house structure to join the rear end of the chassis rail 65 as will presently be apparent. Rearwardly of the rear door opening 57 the panel is provided with the rear door column 278 which is arranged to receive the load from the front end of the rear spring 71, this load being transmitted through the column to the top rail 234. The column 278 also connects the top rail 234 and the associated chassis sill to brace these parts as will presently be more apparent.

Figures 26, 27, 28:
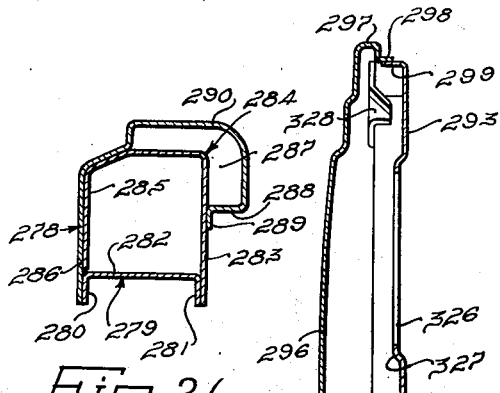

Referring particularly to Figs. 14, 22, and 26, the upper portion of column 278 is formed by the downwardly and rearwardly extending inner channel member 279 having inwardly extending flanges 280 and 281 connected by the web 282. The flange 281 is welded to the inner terminal portion of the flange 283 of the channel member 284, the channel members 282 and 284 forming a hollow column best seen in Fig. 26. The other flange 285 of the channel member 284 terminates short of the flange 280. Welded to the flanges 285 and 280 is the flange 286 which continues around the outer portion of the column in spaced relation therewith at 287 to form the window frame 288, the terminal flange 289 thereof being welded to flange 283.

Figure 25:
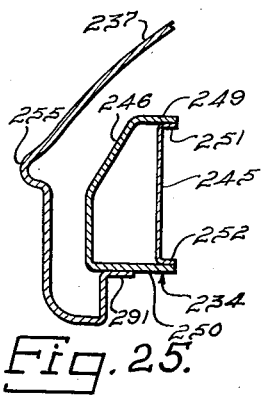

The column flares forwardly and rearwardly at its upper end, as seen in Figs. 14 and 22, the flanges 280 and 281 merging for welding to the aforesaid flange 250 of the top rail outer channel 246 (see Fig. 16). The channel member 284 has its flanges 283 and 285 bent at their upper ends to also lie along the flange 250 for welding thereto as shown in dotted lines in Fig. 14. The window frame 288, as shown in Fig. 26, has its column forming outer shell 290 formed as a downward continuation of the aforesaid panel portion 237, the latter, as shown in Fig. 25, also extending rearwardly of column 278 and beneath the top rail 234 to provide the window frame angled portion 291 which forms a continuation of the frame 288 at column 278.

The channel member 279 at its lower end has a widened foot portion 292 vertically overlapped by and welded to the stiffener plate 293 which, as shown in Fig. 19, has a forward flange 294 welded to the flange 286. At this vertical portion of the column the flange 283 has its inner margin bent at 295 rearwardly of the plate 293 and welded thereto.

The flange 286 continues downwardly and forwardly to form a continuation of the aforesaid side rail flange 259, the flange 286 also extending outwardly of the column 278 below window 288ª and rearwardly to provide the outer shell 296. This outer shell, as shown in Fig. 27, has an upper inwardly ribbed portion 297 terminating in a window frame forming flange 298 welded to the upper marginal flange 299 of the plate 293.

The channel member 284 terminates at the edge 300 (see Fig. 14) and is vertically overlapped by and welded to the upper portion of the channeled column stiffener insert 301 (see Fig. 15) which terminates upwardly at the edge 302. This insert 301 has inwardly extending flanges 303 and 304, the flange 303 being welded to the flange 286. The flange 304 is welded, as shown in Fig. 15, to the inwardly and downwardly dished rear wheel house 305, this wheel house being a downward continuation of the shell 296. Removably secured by fasteners 305ª to each wheel house 305 is an outwardly and downwardly curving fender 305ᵇ, best shown in Figs. 15 and 21.

The plate 293 merges downwardly around the wheel house 305 to provide a portion of the inner web 306 of column 278, this plate having a forward inner flange 307 welded to the flange 286, and also a rearward inner flange 308 which follows the contour of the wheel house 305 for welding thereto rearwardly of the column to the upwardly extending flanged rear edge 309 of plate 293.

The plate web 306 is vertically overlapped at 310 by a channeled lower column insert 311 which curves downwardly and forwardly to tie the column 278 into the rear end of the side rail 207 and connector member 96 as shown in Figs. 14 and 23. The inner web 312 of this column insert has an inwardly extending flange 313 welded to the connector 96, the latter extending laterally outwardly within the side rail 207 for welding to the web 258, the inner channel member of side rail 207 being suitably flanged at the connector 96 for welding thereto.

It will thus be noted that the rear end of the side rail 207 is rigidly connected to the transverse connector member 96, the column 278 forming a continuation of the side rail rearwardly of the connector 96. Furthermore, the load point determined by the rear spring shackle bracket 89, is concentrated to effectively distribute the load to column 278, side rail 207, and the chassis sill 65; the connector 96 rigidly tying these parts together.

These structures at the opposite shackle brackets 89 are further braced transversely of the vehicle by a cross brace 314 having the bottom forwardly extending stiffener flange 315 and the upper rearwardly extending flange 316. The flange 315 is welded to the flange 263 of the side rail inner channel member and is removably secured to the connector 96 by the aforesaid fastener 93ᵇ as shown in Fig. 22. The flange 316 supports the rear seat mounting or flooring panel 317 which is welded thereto, the panel 317 having a lateral extension 318 projecting into the column 278 (see Fig. 23) for welding thereto. The opening between the column 278, the panel 317 and brace 314 is closed by the filler member 318a welded to these adjacent parts. The panel 317 has the rear seat receiving depression 319 formed therein, the sides of the panel being flanged at 320 for welding around the front lower inner portion of the wheel house 305.

The lower edge of wheel house 305 is stiffened by a flange 321 which widens laterally at the lower curved end of column 278 (see Fig. 23), this flange being welded to the inwardly extending flange of the column insert 311 and continuing forwardly below the connector 96 to form a continuation of the flange 260 of the side rail 207.

The central portion, midway of the body structure, of the cross brace 314 is arched to accommodate the drive or propeller shaft (not shown), the arched portion being reinforced by the angled arched member 322 shown in Fig. 22. In Fig. 15 the tunnel structure 323 for the propeller shaft is shown extending forwardly and rearwardly of the arched portion of the cross member 314. The flange 315 of this cross member also serves to support the forward flooring 324 in conjunction with the flange 223 of the side rail 207.

Returning now to the plate 293, it will be noted that this plate is formed with an outwardly depressed ribbed brace 325 providing a channeled beam or brace generally rearwardly and upwardly from column 278 to the downwardly sloping rear portion of the top rail 234. This brace 325 thus rigidly trusses the column and top rail and also reinforces the wheel house 305 as best seen in Figs. 14 and 27. In order to reduce the weight of plate 293 the latter has a cut out portion forming the opening 326 bounded by the offset stiffening border flange 327 best seen in Figs. 19 and 27.

In Fig. 30, I have illustrated the manner of welding the plate 293 to the top rail 234, the connection consisting of a joining plate 328 welded to the outside of the outer channel member 246 and also to the rear terminal portion of the web 325, the web at this portion extending substantially at right angles to the top rail 234. The corner opening between top rail 234, plate 293, and window opening 288a is filled with a filler piece 329 having its inwardly extending border flanges 330 welded to the adjacent members just mentioned.

Referring now particularly to Fig. 34, I have illustrated the manner of forming the vehicle roof structure which covers the opening 64 provided by the four main body assemblies A, B, C, and D. This roof structure has its frame brackets 228 supporting the wood strip 331 suitably secured to the bracket. Secured to this strip is the wire mesh 332 which covers the opening 64 and which is preferably adapted to provide an aerial for a radio (not shown) receiving set.

An outer layer of roofing fabric 333 has its marginal edges return bent around the outer edge of the bracket 228 leaving a border edge depending into the rib 227, this edge being securely held in the rib by a rubber strip which is deformed by compressing the strip into the rib. Suitable felt or other packing 335 is preferably laid between the sheets 332 and 333.

The rear panel D, as shown in Fig. 38, has its main body stamping 335 welded along its downwardly sloping edges at 54 and 55 as aforesaid to the side panels B and C respectively, the panel stamping 335 thus forming a continuation of the side panel portions or outer shell 237. The upper edge of the rear panel D also forms a continuation of the roof structure for the roof opening 64 as best seen in Figs. 14 and 22.

The rear panel D is provided with a divided rear window opening 336 bounded by a window frame formed by the inwardly bent flange 337, the dividing brace 338 serving to stiffen the panel and to also form the sections or divisions of the window opening 336. In order to further stiffen the upper portion of the panel D, I have provided the ribbed stiffening strips 339 welded to the insides of stamping 335 and extending from each side of window opening 336 upwardly to the roof structure bounding the roof opening 64, one of the reinforcing strips 339 being best shown in Fig. 22.

The rear panel D is further reinforced and the body side panels B and C are braced at their rear ends by a plurality of cross bracing structures, certain of which also function to provide a storage space, a shelf, and a back for the rear seat (not shown) adapted to be supported in the depression 319 of the panel 317.

The shelf forming brace 340 has a rear upwardly extending flange 341 welded to the window frame flange 337 (see Figs. 14 and 22) and at the sides of the shelf brace I have provided a channeled bracket 342 adapted to rigidly connect the shelf brace with the top rails 234. The inner channel member 245 terminates at the shelf brace and at the ribbed brace 325, the top rail therebelow comprising the outer channel member 246.

Each bracket 342 (see Fig. 20) has outwardly widening side flanges 343 and 344, respectively, welded to the inner faces of the flanges 249 and 250, the web 345 of the bracket being welded to the under face of the shelf brace 340 to support this shelf. The shelf brace is further stiffened by the pressed ribs 346 and 347, the brace having a forward downwardly and rearwardly flanged marginal edge 348 cut away at the opposite sides to receive the vertically inclined brace 349, the upper edge of which is welded to the downwardly extending portion of flange 348 (see Fig. 20).

Each of the braces 349 has an inner rearwardly bent side stiffening flange 350 and the outer side flange 351 welded to the adjacent plate 293 and to the wheel house 305, the lower edge of each brace 349 overlapping the upper flanged edge 352 of the transverse brace 353 for welding thereto (see Fig. 22). The braces 349 and 353 have depressed stiffening ribs 354, 355 and 356, 357, respectively, these pairs of ribs forming a substantially inverted V-shaped ribbed portion extending substantially from the rear edge of the seat supporting panel 317 to the shelf brace 340.

At its lower edge the brace 353 has a forwardly turned flange 358 for supporting the rear marginal portion of the panel 317, the engaged portions being welded together. For lightness of weight the brace 353 has portions cut away therefrom forming openings 359.

The rear panel D cooperates with shelf brace 340, side braces 349 and transverse brace 353 to provide a storage space, the bottom of which is formed by a floor panel 360 forwardly flanged at 361 for welding to the transverse brace 353. The sides of panel 360 are flanged at 360a for welding to the wheel house as shown in Fig. 28.

Beneath the shelf brace 340 at each side thereof is a flanged angle bracket 362 having its horizontal arm 363 welded to brace 340 and its downwardly and rearwardly extending arm 364 to a stiffening channel member 365. The two channel members 365 are welded to stamping 335 and they converge downwardly (see Fig. 38) to rigidly brace the panel stamping 335. These channel members are interconnected by a stiffener plate 366 which is transversely ribbed or corrugated at 367, the sides of the plate being welded to the channel members 365. Rearwardly of the plate 366, the panel stamping 335 is provided with a generally circular outwardly depressed rib 368 which further lends rigidity to the stamping to carry a spare tire (not shown) at this region and to otherwise strengthen the stamping.

Intermediate the plate 366 and window frame 337 the channel members 365 are further connected by a ribbed stiffener member 369 welded to the stamping 335 and to the channel members in the region of the side brackets 362.

Interconnecting the top rails 234 substantially midway between the window opening 336 and the bottom of the stamping 335 is the forwardly channeled cross brace 370 having its mid-portion welded to the plate 366 (see Figs. 21 and 22) and having its ends deflected toward the stamping 335. Intermediate these ends and the stamping is the vibration and noise dampening material 371 such as felt strips adapted to press rearwardly against the panel stamping 335 and prevent any objectionable rumbling noises or audible vibrations thereof and also to lend support to the stamping 335.

The cross brace 370 is supported by the top rails 234 by the channeled connectors 372 welded to the cross brace and to the channeled angle brackets 373, the latter fitting within the channel member 246 for welding thereto.

The rear edge of the floor panel 360 and the bottom edge of the stamping 335 are flanged together at 374 and 375 for forming a welded reinforced marginal edge and these panels are further stiffened adjacent said edges by the forwardly flanged channeled connector members 376 which have bent terminal portions 377 and 378 respectively, welded to a channel member 365 and to the upper surface of the floor panel 360 as best shown in Figs. 14 and 22.

Each of the chassis sills, such as the sill 65 as seen in Figs. 14, 22, and 23, is reinforced in the vicinity of the connector 96 by constructing the sill with an inner channeled member 379 which carries the bracket 92 and which has its flanges 380 and 381 (see Fig. 22) welded within the flanges 382 and 383 respectively of the main portion of the sill 65.

Figure 29:
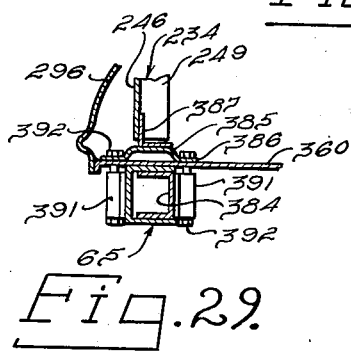

In Figs. 14, 15, and 29, I have illustrated the manner of anchoring the lower end of one of the top members 234 to body side rails. The rear end of the typical side rail 65, as best seen in Figs. 14 and 29, has the inner channeled member 384 and above the forward portion thereof is the relatively heavy stamped floor channel 385 provided with side flanges 386 flush with the floor panel 360 and welded thereto. Welded to the channel 385 and to the outer member 246 of the top rail 234 is the angled connector 387, the floor channel 385 having its rear portion deflected inwardly of the body structure and the associated body side rail 65, as best shown in Fig. 15, to carry a bumper (not shown) at the rear end 388 thereof.

The rear end of the rail 65 terminates short of the outer shell 296, the box-like cross member 389 bracing the side rails 65 and 66 at their rear ends. Forwardly of the cross member 389 the side rails may be additionally connected by welded cross braces, one being illustrated at 390 in Fig. 15.

The entire assembled body structure is preferably removably secured to the chassis sills 65 and 66, certain of the securing bolts having been referred to hereinbefore. In addition thereto, the typical rail 65 (see Figs. 15 and 29) has the bolt-receiving brackets 391 secured thereto, these brackets receiving bolt assemblies 392 which removably secure the body to the rail 65, the bolts passing through flanges 386 and floor panel 360.

Additional brackets 393 and 394 are carried by the cross member 389, the associated removable fasteners 395 and 396 connecting the body through the floor panel 360 to the chassis structure. Forwardly of the brace 349 are the side bolts 397 which further removably secure the body structure to each of the body side rails adjacent the rear wheel housings 305, as shown in Fig. 15.

I find it expedient by way of example, to completely assemble the front section A and then to join this assembly with a rear assembly formed of the side panels B and C together with the rear panel D and the various cross bracings, the completely assembled body structure being then bolted to the chassis structure.

Referring to Figs. 31 to 33, inclusive, I have illustrated my invention as applied to a so-called two door type sedan body structure in which the intermediate column 257 of the Fig. 1 embodiment has been omitted and the rear column 278' has been moved forwardly of the body with respect to the position of the generally similar rear column 278 of Fig. 14.

Inasmuch as many of the parts of the body structure of the two door sedan are identical to corresponding parts of the four door sedan previously described, I have used the same reference characters as heretofore employed and the description of such parts will not be repeated. Other parts which have been changed in size, location, or the like, have been given primed reference characters corresponding to unprimed characters in the previous embodiment, it being understood that in such instances the corresponding parts are generally similar in their structure and function and therefore need not be again described in full detail.

In Fig. 31, only the rear end of the body structure has been shown since the front section A is preferably the same as previously described. Thus, Fig. 4 is intended to illustrate the forward continuation of either the Fig. 14 or the Fig. 31 rear end structures. Furthermore, in Fig. 31 the rear panel D is the same as heretofore described, the interchangeability of the main body portions A and D greatly reducing the cost of manufacture for the two types of bodies.

One of the side panels B' is illustrated in Fig. 31, this typical side panel being welded at 54' to the rear panel D. The panel B' has its column 278' extending substantially vertically between the top rail 234' and the lower side rail 207', these rails being respectively almost identical to the rails 234 and 207. In Fig. 31 the column 278' is now rearwardly adjacent to the brace 272' although, in general, the column 278' is joined to the top rail 234' substantially as heretofore described.

In Fig. 32 the outer channel member 246' of the top rail 234' continues across the top of the column 278' but the inner channel member 245' is illustrated as being severed rearwardly of the brace 272' with overlapped ends indicated at 400. The column is otherwise generally similar to the column 278.

Moving the column 278' forwardly provides a relatively larger rear window opening defined by the window frame forming flanges 288', 291', and 298', the plate 293' being also lengthened and having the openings 326'.

One important difference in the plate 293' as compared with the plate 293 lies in the manner of distributing the load directly from the front of the rear springs 71 to column 278' and top rail 234'. Thus, plate 293' has its channeled rib 325' substantially V-shaped, the arms of the rib respectively extending to substantially the midpoint in the height of column 278' and to the top rail 234' just above the shelf bracket 342. At the apex of the V-rib 325' a joining plate 401 is welded to the plate 293' and to the side rail 207' at the load point of the spring 71, it being understood that the same chassis rail 65 is shown in Fig. 31 and that the chassis rail is connected to the body side rail 207' by a connector 96 and associated parts similar in this respect to the Fig. 23 arrangement.

It will be apparent that I have provided a body structure wherein a truss construction is employed to resist the applied forces through definite structural members in which the primary stresses are the simple stresses of tension or compression, the severe bending stresses present in conventional types of automobile bodies and frames being largely eliminated. Thus, the body and chassis longitudinally extending lower side rails are in tension and the forward and rear inclined members as well as the roof portions of the top rails are in compression when a static load, due to the weight of the vehicle and passengers, is on the wheels.

The spring reactions are transmitted largely to the body structure in an improved manner, the front spring reaction and engine loads being transmitted directly through the rearwardly and upwardly inclined members of the front body section to the front door columns and top rails. The body shell or panels, in many instances, are constructed to take a portion of the loads, thereby minimizing the body weight.

While the chassis sills may be dispensed with, if desired, and the total loads taken by the body structure, I prefer largely for manufacturing and assembly convenience to provide the relatively light chassis structure as illustrated although the loads are largely taken by the trussed body structure.

Various modifications and changes will readily be apparent from the teachings of my invention and many changes may be made within the scope and spirit of my invention as defined in the appended claims, my invention in its broader aspects not being limited to the foregoing described illustrative embodiments.

What I claim is:

1. In a motor vehicle body structure having a driver's compartment, a pair of laterally spaced hollow beam structures extending forwardly of said compartment and downwardly to form the front end of the body structure, ground wheel supporting means associated with said hollow beam structures and adapted to transmit at least a portion of the body supporting forces upwardly through said hollow beam structures and rearwardly therethrough toward said compartment, each of said hollow beam structures providing a wheelhouse, and a forwardly and downwardly curved beam structurally connected to and lying within each of said hollow beam structures for stiffening the latter.

2. In a motor vehicle body structure having a driver's compartment, a pair of laterally spaced hollow beam structures extending forwardly of said compartment and downwardly to form the front end of the body structure, ground wheel supporting means associated with said hollow beam structures and adapted to transmit at least a portion of the body supporting forces upwardly through said hollow beam structures and rearwardly therethrough toward said compartment, each of said hollow beam structures providing a wheelhouse, and a channel member structurally connected to and facing each of said hollow beam structures to form a stiffening box structure therewith.

3. In a motor vehicle body structure having a driver's compartment, a pair of laterally spaced hollow beam structures extending forwardly of said compartment and downwardly to form the front end of the body structure, ground wheel supporting means associated with said hollow beam structures and adapted to transmit at least a portion of the body supporting forces upwardly through said hollow beam structures and rearwardly therethrough toward said compartment, each of said hollow beam structures providing a wheelhouse, and means providing a second hollow beam curved about at least a portion of each of said wheelhouses and respectively structurally connected to and lying within the first said hollow beam structures for reinforcing the latter.

4. In a motor vehicle body structure having a driver's compartment, a pair of laterally spaced hollow beam structures extending forwardly of said compartment and downwardly to form the front end of the body structure, ground wheel supporting means associated with said hollow beam structures and adapted to transmit at least a portion of the body supporting forces upwardly through said hollow beam structures and rearwardly therethrough toward said compartment, each of said hollow beam structures providing a wheelhouse, said body structure including laterally spaced door column structures forwardly at the sides of said compartment, and means for structually connecting said hollow beam structures respectively to said door column structures, said connecting means including a reinforcing beam structurally connected to each of said hollow beams, said reinforcing beams respectively extending substantially directly forwardly from said column structures to points above said wheelhouses at the forward portions thereof and thence downwardly adjacent said wheelhouses.

5. In a motor vehicle body structure having a driver's compartment, a pair of laterally spaced hollow beam structures extending forwardly of said compartment and downwardly to form the front end of the body structure, ground wheel supporting means associated with said hollow beam structures and adapted to transmit at least a portion of the body supporting forces upwardly through said hollow beam structures and rearwardly therethrough toward said compartment, each of said hollow beam structures providing a wheelhouse, said body structures including laterally spaced door column structures forwardly at the sides of said compartment, means for structurally connecting said hollow beam structures respectively to said door column structures, said connecting means including a reinforcing beam structurally connected to and extending substantially directly from each of said hollow beams and curved respectively about at least a portion of said wheelhouses, and an inclined brace extending between said ground wheel supporting means and each of said column structures to substantially said connections between said reinforcing beams and said hollow beams at said door column structures.

6. In a motor vehicle body structure having a driver's compartment, a pair of laterally spaced hollow beam structures extending forwardly of said compartment and downwardly to form the front end of the body structure, ground wheel supporting means associated with said hollow beam structures and adapted to transmit at least a portion of the body supporting forces upwardly through said hollow beam structures and rearwardly therethrough toward said compartment, each of said hollow beam structures providing a wheelhouse, said body structure including laterally spaced door column structures forwardly at the sides of said compartment, means for structurally connecting said hollow beam structures respectively to said door column structures, and an inclined brace member at each side of said body structure extending respectively between said ground wheel supporting means and said connections between said hollow beams and columns.

7. In a motor vehicle body structure having a driver's compartment, a hollow door column forwardly of said compartment, said column including a forwardly extending outer panel and an inner panel spaced therefrom, said panels having forwardly extended structural portions spaced to provide a downwardly curved wheelhouse beam, ground wheel supporting means adapted to load the forward end of said beam, said inner panel being formed with a brace rib extending between said wheel supporting means and said column at a point intermediate the height of the column.

8. In a motor vehicle body structure having a driver's compartment, a hollow door column forwardly of said compartment, said column including a forwardly extending outer panel and an inner panel spaced therefrom, said panels having forwardly extended structural portions spaced to provide a downwardly curved wheelhouse beam, ground wheel supporting means adapted to load the forward end of said beam, said inner panel being formed with a brace rib extending between said wheel supporting means and said column at a point intermediate the height of the column, and a connector plate secured to said column and to said inner panel adjacent the upper end of said brace rib.

9. In a motor vehicle body structure having a driver's compartment, longitudinally extending laterally spaced rails located forwardly of said compartment and adapted for structural connection to said body structure, a pair of laterally spaced hollow beam structures extending forwardly of said compartment and downwardly toward the front ends of said rails to form the front end of said body structure, means for connecting the downwardly extending ends of said hollow beam structures to the front end portions of said rails respectively, ground wheel supporting means connected to said rails and adapted to transmit at least a portion of the body supporting forces upwardly through said hollow beam structures and rearwardly therethrough toward said compartment, each of said hollow beam structures providing a wheelhouse, said body structure including laterally spaced door column structures forwardly at the sides of said compartment, means for structurally connecting said hollow beam structures respectively to said door column structures, and a stiffener member structurally connected to and lying within each of said hollow beam structures for stiffening the latter.

10. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from an associated wheelhouse to form a portion of one of said column structures, and an inclined brace member extending forwardly and downwardly from a point intermediate the height of each of said column structures, and means for securing the lower ends of said brace members to said wheel supporting means respectively at points intermediate said wheelhouse structures and said column structures.

11. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from a portion of one of said column structures, and a pair of forwardly and downwardly extending brace members structurally attached rearwardly to each of said column structures intermediate the height thereof, said brace members having their lower end structurally connected to said wheel supporting means respectively forwardly and rearwardly of each of said wheelhouse structures.

12. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from an associated wheelhouse to form a portion of said column structures, a brace member extending forwardly and downwardly from each of said column structures to said wheel supporting means, said column structures being respectively rearwardly inclined above the upper ends of said brace members approximately in continuity with said brace members, and a roof rail extending rearwardly from each of said column structures.

13. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from an associated wheelhouse to form a portion of said column structures, a brace member extending forwardly and downwardly from each of said column structures to said wheel supporting means, said column structures being respectively rearwardly inclined above the upper ends of said brace members approximately in continuity with said brace members, a roof rail extending rearwardly from each of said column structures and downwardly at the rear of the body stucture, and rear ground wheel supporting means loading the downwardly extending portions of said roof rails.

14. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from a portion of one of said column structures, a pair of forwardly and downwardly extending brace members structurally attached rearwardly to each of said column structures intermediate the height thereof, said brace members having their lower ends structurally connected to said wheel supporting means respectively forwardly and rearwardly of each of said wheelhouse structures, said column structures being respectively inclined rearwardly from the point of attachment thereto of said pair of brace members, and a roof beam extending rearwardly from each of said column structures.

15. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from an associated wheelhouse to form a portion of one of said column structures, each of said compression structures including a wall spaced inwardly from said outer wall and serving to structurally connect said compression structure with its associated column structure, each of said inner walls being provided with an inclined brace between said wheel supporting means and an associated column structure, and a bracket for structurally connecting said inclined brace at its lower end to said wheel supporting means.

16. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, said body structure including laterally spaced door column structures forwardly at the sides of said compartment, each of said compression structures including a wall forming the outer shell of the body structure, said outer shell having a portion thereof extending to form a portion of one of said column structures, a transverse cowl panel connecting the walls of said compression structures and having a forward margin forming the rear boundary of a hood cover opening the sides of which opening are bounded by said compression structures, a transverse dash plate having its upper edge secured to said cowl panel adjacent said forward margin thereof, said dash plate extending downwardly from said cowl panel to form a front wall for said compartment and adapted to laterally brace said compression structures, each of said compression structures including a wall spaced within said first walls, means structurally connecting said second walls with said column structures respectively, said dash plate having outer side flanges in contact with said inner walls and secured thereto.

17. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, said body structure including laterally spaced door column structures forwardly at the sides of said compartment, each of said compression structures including a wall forming the outer shell of the body structure, said outer shell having a portion thereof extending to form a portion of one of said column structures, a transverse cowl panel connecting the walls of said compression structures and having a forward margin forming the rear boundary of a hood cover opening the sides of which opening are bounded by said compression structures, a transverse dash panel secured to said cowl panel and extending downwardly therefrom to provide a front wall for said compartment and adapted to laterally brace said compression structures, an upright brace member secured to each side portion of said dash panel, and means for attaching said upright brace members to said wheel supporting means.

18. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, said body structure including laterally spaced door column structures forwardly at the sides of said compartment, each of said compression structures including a wall forming the outer shell of the body structure, said outer shell having a portion thereof extending to form a portion of one of said column structures, a transverse cowl panel connecting the walls of said compression structures and having a forward margin forming the rear boundary of a hood cover opening the sides of which opening are bounded by said compression structures, a transverse dash panel secured to said cowl panel and extending downwardly therefrom to provide a front wall for said compartment and adapted to laterally brace said compression structures, an upright brace member secured to each side portion of said dash panel, and means for attaching said upright brace members to said wheel supporting means, each of said compression structures providing a wheelhouse, said upright brace members lying adjacent said wheelhouses respectively and being secured thereto.

19. In a motor vehicle body structure having a driver's compartment, longitudinally extending laterally spaced rails located forwardly of said compartment and adapted for structural connection to said body structure, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, each of said compression structures including a wall forming the outer shell of the body structure, said outer shell having a portion thereof extending rearwardly from an associated wheelhouse to form a portion of one of said column structures, a cross member connecting said rails at the rear to said wheelhouses and projecting laterally beyond said rails, and brace structures between said projecting portions of said cross member and said column structures, said wheel supporting means loading said rails adjacent to said cross member.

20. In a motor vehicle body structure having a driver's compartment, longitudinally extending laterally spaced rails located forwardly of said compartment and adapted for structural connection to said body structure, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, a substantially horizontally disposed shear plate secured to the rear of each of said wheelhouses, and means for structurally securing said shear plates to said rails respectively, said shear plates lying forwardly spaced from said column structures.

21. In a motor vehicle body structure having a driver's compartment, longitudinally extending laterally spaced rails located forwardly of said compartment and adapted for structural connection to said body structure, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, a cross member between said rails having portions thereof respectively projecting outwardly beyond said rails, and a substantially horizontal shear plate between each of said wheelhouses and said projecting portions of said cross members.

22. In a motor vehicle body structure having a driver's compartment, longitudinally extending laterally spaced rails located forwardly of said compartment and adapted for structural connection to said body structure, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, each of said compression structures providing a wheelhouse, said body structure including laterally spaced door column structures forwardly at the sides of said compartment, a cross member between said rails having portions thereof respectively projecting outwardly beyond said rails, a substantially horizontal shear plate between each of said wheelhouses and said projecting portions of said cross members, and a brace extending upwardly from each of said cross member projecting portions and rearwardly therefrom for transmitting loads therefrom to said column structures.

23. In a motor vehicle body structure having a driver's compartment, a pair of laterally spaced compression structures extending forwardly of said compartment and downwardly to form the front end of said body structure, ground wheel supporting means associated with said compression structures and adapted to transmit at least a portion of the body supporting forces upwardly through said compression structures and rearwardly therethrough toward said compartment, said body structure including laterally spaced door column structures forwardly at the sides of said compartment, each of said compression structures including a wall forming the outer shell of the body structure, said outer shell having a portion thereof extending rearwardly from an associated wheelhouse to form a portion of one of said column structures, a transverse cowl panel connecting the walls of said compression structures and having a forward margin forming the rear boundary of a hood cover opening the sides of which opening are bounded by said compression structures, and a transverse dash plate having its upper edge secured to said cowl panel adjacent said forward margin thereof, said dash plate extending downwardly from said cowl panel to form a front wall for said compartment and adapted to laterally brace said compression structures, said cowl panel having a windshield receiving portion and a shelf portion extending rearwardly therefrom, said shelf portion terminating in a downwardly extending instrument panel adapted to structurally brace said column structures.

24. In a motor vehicle body structure having a driver's compartment, forward front door column structures at opposite sides of said compartment, a roof structure projecting forwardly beyond said column structures to provide a windshield frame support, laterally spaced body side rails extending rearwardly from the lower end portions of said column structures, a pair of laterally spaced compresson structures extending forwardly and downwardly from said compartment to form the front end of said body structure, ground wheel supporting means associated with said column structures and compression structures and adapted to transmit at least a portion of the body supporting forces therethrough, a transverse roof brace connecting said column structures and reinforcing the upper transverse margin of said windshield frame, a dash panel transversely connecting said compression structures, means for transmitting a portion of said body supporting forces to said dash panel, and means including a windshield frame brace midway across said body structure for transmitting said forces from said dash panel to said transverse roof brace.

25. In a motor vehicle body structure having a driver's compartment, forward front door column structures at opposite sides of said compartment, a roof structure projecting forwardly beyond said column structures to provide a windshield frame support, laterally spaced body side rails extending rearwardly from the lower end portions of said column structures, a pair of laterally spaced compression structures extending forwardly and downwardly from said compartment to form the front end of said body structure, ground wheel supporting means associated with said column structures and compression structures and adapted to transmit at least a portion of the body supporting forces therethrough, a transverse roof brace connecting said column structures and reinforcing the upper transverse margin of said windshield frame, a dash panel transversely connecting said compression structures, means for transmitting a portion of said body supporting forces to said dash panel, means including a windshield frame brace mid-way across said body structure for transmitting said forces from said dash panel to said transverse roof brace, and a stiffener brace associated with said roof structure and having its lower end extending across said transverse brace for receiving said forces from said windshield frame brace.

26. In a motor vehicle body structure, upper and lower body rail structures, chassis rail structures, front and rear door columns at each side of the body structure for connecting said upper and lower body rails, transversely spaced compression structures extending forwardly of said front columns, means for structurally connecting said compression structures to said front columns, said front columns being positioned laterally beyond said chassis rails, a cross member extending transversely of said chassis rails forwardly of said columns for laterally bracing said chassis rails, said cross member having portions thereof projecting outwardly beyond said chassis rails, and means for structurally connecting said front columns respectively to said projecting portions of said cross member.

27. In a motor vehicle body structure, upper and lower body rail structures, chassis rail structures, front and rear door columns at each side of the body structure for connecting said upper and lower body rails, transversely spaced compression structures extending forwardly of said front columns, means for structurally connecting said compression structures to said front columns, said front columns being positioned laterally beyond said chassis rails, a cross member extending transversely of said chassis rails forwardly of said columns for laterally bracing said chassis rails, said cross member having portions thereof projecting outwardly beyond said chassis rails, means for structurally connecting said front columns respectively to said projecting portions of said cross member, a second cross member extending transversely of said chassis rails rearwardly adjacent said front columns for laterally bracing said lower body rails, said second cross member having portions thereof projecting outwardly beyond said chassis rails, and means for structurally connecting said lower body rails respectively to said projecting portions of said second cross member.

28. In a motor vehicle metal body structure, upright front and rear door column structures, a bottom rail structurally connecting the lower ends of said columns, a roof rail structurally connecting the upper ends of said columns, said roof rail extending rearwardly and downwardly from said rear column to substantially the bottom and rear of said body structure, and a compression structure projecting forwardly from said front column and downwardly so constructed and arranged as to provide a front wheelhouse.

29. In a motor vehicle metal body structure, upright front and rear door column structures, a bottom rail structurally connecting the lower ends of said columns, a roof rail structurally connecting the upper ends of said columns, said roof rail extending rearwardly and downwardly from said rear column to substantially the bottom and rear of said body structure, a compression structure projecting forwardly from said front column and downwardly so constructed and arranged as to provide a front wheelhouse, a chassis rail for mounting said body structure, and means for structurally connecting the lower forward end of said compression structure with the front of said chassis rail.

30. In a motor vehicle body structure, having a driver's compartment, a front door column at the side of the body structure, a compression structure extending downwardly and forwardly from said column, ground wheel supporting means for mounting the front end of said body structure and including a longitudinal side rail terminating forwardly in an inverted U-shaped portion, a spring shackle bracket extending upwardly into said side rail portion, a saddle bracket mounted on said side rail portion and having a portion thereof secured to said shackle bracket, and an angled connector member adapted to connect said saddle bracket to the front end of said compression structure.

31. In a motor vehicle body structure, a longitudinal side chassis rail, a longitudinal body rail spaced outwardly from said rail and having its rear end rising upwardly to provide a rear door column, a connector extending transversely of said chassis rail, means securing the inner end of said connector to the upper face of said chassis rail, means securing the outer end of said connector to said body rail adjacent said column, and rear ground wheel supporting means including a spring shackle bracket adapted to load said connector, said shackle bracket being secured to said connector intermediate said chassis rail and said body rail.

32. In a motor vehicle body structure, an inwardly channeled front door column member, a front wheelhouse structure having inner and outer spaced panels extending rearwardly to said column member, a body rail extending rearwardly from the lower end of said column, an angled corner brace plate having an upwardly extending leg portion connecting said inner panel to said column member, said brace having a rearwardly extending leg portion forming the inner web of said body rail.

33. In a motor vehicle body structure, an inwardly channeled front door column member, a front wheelhouse structure having inner and outer spaced panels extending rearwardly to said column member, a body rail extending rearwardly from the lower end of said column, an angled corner brace plate having an upwardly extending leg portion connecting said inner panel to said column member, said brace having a rearwardly extending leg portion forming the inner web of said body rail, the rear flange of said channeled column member being curved at the lower end of said column rearwardly to form an upper wall of said body rail.

34. In a motor vehicle body structure, an inwardly channeled front door column member, a front wheelhouse structure having inner and outer spaced panels extending rearwardly to said column member, a body rail extending rearwardly from the lower end of said column, an angled corner brace plate having an upwardly extending leg portion connecting said inner panel to said column member, said brace having a rearwardly extending leg portion forming the inner web of said body rail, said inner web having a floor supporting flange projecting inwardly at its upper edge.

35. In a motor vehicle body structure, an inwardly channeled front door column member, a front wheelhouse structure having inner and outer spaced panels extending rearwardly to said column member, a body rail extending rearwardly from the lower end of said column, an angled corner brace plate having an upwardly extending leg portion connecting said inner panel to said column member, said brace having a rearwardly extending leg portion forming the inner web of said body rail, and an angled toe board supporting bracket secured to said inner panel and said upwardly extending leg portion of said corner brace.

36. In a motor vehicle metal body structure, upright front and rear door column structures at each side of said body, a body rail structurally connecting the lower ends of said columns, a roof rail structurally connecting the upper ends of said columns, said roof rails extending rearwardly and downwardly from said rear columns to substantially the bottom and rear of said body structure, a rear panel lying intermediate said downwardly extending portions of said roof rails, means transversely connecting said roof rails, and a vibration dampening material carried by said transverse connecting means and pressing against said rear panel.

37. In a motor vehicle metal body structure, upright front and rear door column structures at each side of said body, a body rail structurally connecting the lower ends of said columns, a roof rail structurally connecting the upper ends of said columns, said roof rails extending rearwardly and downwardly from said rear columns to substantially the bottom and rear of said body structure, a substantially horizontal shelf between said roof rails and extending rearwardly therefrom, a rear panel for said body structure intermediate said roof rails and having a flanged window opening, said shelf having a flange at its rear transverse edge secured to said window opening flange.

38. In a motor vehicle metal body structure, upright front and rear door column structures at each side of said body, a body rail structurally connecting the lower ends of said columns, a roof rail structurally connecting the upper ends of said columns, said roof rails extending rearwardly and downwardly from said rear columns to substantially the bottom and rear of said body structure, a substantially horizontal shelf between said roof rails and extending rearwardly therefrom, a rear panel for said body structure intermediate said roof rails, laterally spaced channel members adapted to stiffen said rear panel, and a bracket connecting each of said channel members to said shelf.

39. In a motor vehicle metal body structure, upright front and rear door column structures at each side of said body, a body rail structurally connecting the lower ends of said columns, a roof rail structurally connecting the upper ends of said columns, said roof rails extending rearwardly and downwardly from said rear columns to substantially the bottom and rear of said body structure, a substantially horizontal shelf between said roof rails and extending rearwardly therefrom, a rear panel for said body structure intermediate said roof rails, means for securing the rear of said shelf to said rear panel, and a rear wheel house structure intermediate the lower ends of said rear columns and said roof rails at each side of said body.

40. In a motor vehicle metal body structure, upright front and rear door column structures at each side of said body, a body rail structurally connecting the lower ends of said columns, a roof rail structurally connecting the upper ends of said columns, said roof rails extending rearwardly and downwardly from said rear columns to substantially the bottom and rear of said body structure, a substantially horizontal shelf between said roof rails and extending rearwardly therefrom, a rear panel for said body structure intermediate said roof rails, means for securing the rear of said shelf to said rear panel, a rear wheelhouse structure intermediate the lower ends of said rear columns and said roof rails at each side of said body, said rear columns each including a plate member, and means securing said plate member to one of said wheelhouses and roof rails.

41. In a motor vehicle metal body structure, upright front and rear door column structures at each side of said body, a body rail structurally connecting the lower ends of said columns, a roof rail structurally connecting the upper ends of said columns, said roof rails extending rearwardly and downwardly from said rear columns to substantially the bottom and rear of said body structure, a substantially horizontal shelf between said roof rails and extending rearwardly therefrom, a rear panel for said body structure intermediate said roof rails, means for securing the rear of said shelf to said rear panel, a rear wheelhouse structure intermediate the lower ends of said rear columns and said roof rails at each side of said body, said rear columns each including a plate member, and means securing said plate member to one of said wheelhouses and roof rails, said plate members each having a strengthening rib formed therein.

42. In a motor vehicle metal body structure, upright front and rear door column structures at each side of said body, a body rail structurally connecting the lower ends of said columns, a roof rail structurally connecting the upper ends of said columns, said roof rails extending rearwardly and downwardly from said rear columns to substantially the bottom and rear of said body structure, a substantially horizontal shelf between said roof rails and extending rearwardly therefrom, a rear panel for said body structure intermediate said roof rails, means for securing the rear of said shelf to said rear panel, a rear wheelhouse structure intermediate the lower ends of said rear columns and said roof rails at each side of said body, said rear columns each including a plate member, and means securing said plate member to one of said wheelhouses and roof rails, said plate members each having a strengthening rib formed therein and extending between a rear column and roof rail.

43. In a motor vehicle metal body structure, upright front and rear door column structures at each side of said body, a body rail structurally connecting the lower ends of said columns, a roof rail structurally connecting the upper ends of said columns, said roof rails extending rearwardly and downwardly from said rear columns to substantially the bottom and rear of said body structure, a substantially horizontal shelf between said roof rails and extending rearwardly therefrom, a rear panel for said body structure intermediate said roof rails, means for securing the rear of said shelf to said rear panel, a rear wheelhouse structure intermediate the lower ends of said rear columns and said roof rails at each side of said body, said rear columns each including a plate member, and means securing said plate member to one of said wheelhouses and roof rails, said plate members each having a substantially V-shaped strengthening rib formed therein intermediate a rear column and roof rail.

44. In a motor vehicle metal body structure, upright front and rear door column structures at each side of said body, a body rail structurally connecting the lower ends of said columns, a roof rail structurally connecting the upper ends of said columns, said roof rails extending rearwardly and downwardly from said rear columns to substantially the bottom and rear of said body structure, a substantially horizontal shelf between said roof rails and extending rearwardly therefrom, a rear panel for said body structure intermediate said roof rails, means for securing the rear of said shelf to said rear panel, a rear wheelhouse structure intermediate the lower ends of said rear columns and said roof rails at each side of said body, said rear columns each including a plate member, means securing said plate member to one of said wheelhouses and roof rails, and a seat back supporting member extending downwardly and forwardly from the front of said shelf.

45. In a motor vehicle metal body structure, upright front and rear door column structures at each side of said body, a body rail structurally connecting the lower ends of said columns, a roof rail structurally connecting the upper ends of said columns, said roof rails extending rearwardly and downwardly from said rear columns to substantially the bottom and rear of said body structure, a substantially horizontal shelf between said roof rails and extending rearwardly therefrom, a rear panel for said body structure intermediate said roof rails, means for securing the rear of said shelf to said rear panel, a rear wheelhouse structure intermediate the lower ends of said rear columns and said roof rails at each side of said body, said rear columns each including a plate member, means securing said plate member to one of said wheelhouses and roof rails, and a seat back supporting member extending downwardly and forwardly from the front of said shelf, and means for securing said supporting member at the sides thereof to said wheelhouses.

46. In a motor vehicle metal body structure, a front section having a dash and a pair of forwardly extending fabricated cowl beam structures providing front wheelhousings, said front section having rearwardly extending body lower rail members, and a panel having a windshield opening formed therein, said panel having slanting cowl projections respectively welded to said cowl beam structures.

47. In a motor vehicle metal body structure, a front section having a dash and a pair of forwardly extending fabricated cowl beam structures providing front wheelhousings, said front section having rearwardly extending body lower rail members, side sections each including a rear door column and a forwardly extending body lower rail member adapted for welding with a rail member of said front section, each of said side sections including a roof rail structure extending rearwardly from said front and downwardly substantially to the rear of said side section.

48. In a motor vehicle structure, fabricated hollow top rail structures, bottom rail structures, rear door columns connecting said rail structures, front door columns projecting downwardly as structural extensions of the forward ends of said top rail structures for connection with said bottom rail structures, a front wheel supporting structure extending forwardly of said front columns and including a frame structure constructed and arranged to mount said wheels and the motor vehicle power plant, said front door columns and said top rail structures respectively defining marginal portions of door openings, a pair of load transmitting struts respectively disposed at each side of the vehicle and extending upwardly and rearwardly in substantially a straight line of inclination from said frame structure, means for structurally securing the lower ends of said struts to said frame structure, and means for structurally connecting the upper ends of said struts respectively to said front columns at points intermediate the height thereof so constructed and arranged to transmit load on said frame structure compressively through said struts to and through said hollow top rail structures substantially free from abrupt directional changes of compressive forces.

49. In a motor vehicle structure, fabricated hollow top rail structures, bottom rail structures, front and rear columns connecting said rail structures, a front wheel supporting structure extending forwardly of said front columns and including a frame structure constructed and arranged to mount said wheels and the motor vehicle power plant, said front door columns and said top rail structures respectively defining marginal portions of door openings, a pair of load transmitting struts respectively disposed at each side of the vehicle and extending upwardly and rearwardly in substantially a straight line of inclination from said frame structure, means for structurally securing the lower ends of said struts to said frame structure, and means for structurally connecting the upper ends of said struts respectively to said front columns at points intermediate the height thereof so constructed and arranged to transmit at least a portion of the load on said frame structure compressively through said struts to said hollow top rail structures, the front ends of said top rail structures inclining forwardly and downwardly to form the upper portions of said front columns and each lying substantially in a straight line with its associated strut, said structural connecting means for the upper ends of said struts joining said front columns substantially adjacent the respective lower ends of said forwardly and downwardly inclined column portions.

50. In a motor vehicle structure, upper and lower body rails, a front wheel and power plant frame supporting structure projecting forwardly of said lower body rails, front and rear door column structures connecting said upper and lower body rails, front door column structures projecting downwardly as structural extensions of the forward ends of said upper body rails for connection with said lower body rails, a compression strut at each side of the vehicle respectively extending in substantially a straight line of inclination forwardly and downwardly from a point intermediate the height of said front columns to said frame supporting structure, said struts having their lower ends extending to said frame structure for structural attachment thereto, said front columns having upper end portions sloping upwardly and rearwardly from substantially the juncture with said struts to facilitate transmission of compressive forces from said struts to said upper body rails, said supporting frame structure comprising a pair of chassis rails extending rearwardly of the vehicle for mounting said lower body rails.

51. In a motor vehicle body structure, top and bottom body rail structures at each side of said body structure, front column structures respectively connecting said rail structures and providing a door marginal opening, rear column structures connecting said rail structures and providing a door marginal opening, a front wheel supporting frame structure extending forwardly of said front column door openings, the upper portions of said front column structures sloping upwardly and rearwardly in longitudinal structural continuity with said top body rail structures, and struts inclining forwardly and downwardly to said frame structure from said front column structures, said top rail structures having rear structural extensions thereof sloping downwardly and rearwardly beyond said rear column structures to approximately the rear end of said body structure, said struts, upper sloping front column portions, top body rails and rear sloping extensions thereof together providing a pair of structurally continuous arch-like compression truss structures braced by said bottom rails, rear column structures and frame structure.

52. In a motor vehicle body structure, top and bottom body rail structures at each side of said body structure, front column structures respectively connecting said rail structures and providing a door marginal opening, rear column structures connecting said rail structures and providing a door marginal opening, a front wheel supporting frame structure extending forwardly of said front column door openings, the upper portions of said front column structures sloping upwardly and rearwardly in longitudinal structural continuity with said top body rail structures, struts inclining forwardly and downwardly to said frame structure from said front column structures, said top rail structures having rear structural extensions thereof sloping downwardly and rearwardly beyond said rear column structures to approximately the rear end of said body structure, said struts, upper sloping front column portions, top body rails and rear sloping extensions thereof together providing a pair of structurally continuous arch-like compression truss structures braced by said bottom rails, rear column structures and frame structure, and a chassis frame extending rearwardly from said frame structure for mounting said bottom rails.

53. In a motor vehicle structure, fabricated hollow top rail structures, bottom rail structures, rear door columns connecting said rail structures, front door columns projecting downwardly as structural extensions of the forward ends of said top rail structures for connection with said bottom rail structures, a front wheel supporting structure extending forwardly of said front columns and including a frame structure constructed and arranged to mount said wheels and the motor vehicle power plant, said front door columns and said top rail structures respectively defining marginal portions of door openings, a pair of load transmitting struts respectively disposed at each side of the vehicle and extending upwardly and rearwardly in substantially a straight line of inclination from said frame structure, means for structurally securing the lower ends of said struts to said frame structure, means for structurally connecting the upper ends of said struts respectively to said front columns at points intermediate the height thereof so constructed and arranged to transmit at least a portion of the load on said frame structure compressively through said struts to said hollow top rail structures, and a second pair of load transmitting strut structures respectively disposed at each side of the vehicle and curving upwardly and rearwardly from substantially the front end of said frame structure, the rear ends of said second pair of strut structures being arranged to transmit a further portion of the load on said frame structure compressively through said second pair of strut structures to said front door columns for loading said hollow top rail structures.

54. In a motor vehicle structure, fabricated hollow top rail structures, bottom rail structures, rear door columns connecting said rail structures, front door columns projecting downwardly as structural extensions of the forward ends of said top rail structures for connection with said bottom rail structures, a front wheel supporting structure extending forwardly of said front columns and including a frame structure constructed and arranged to mount said wheels and the motor vehicle power plant, said front door columns and said top rail structures respectively defining marginal portions of door openings, a pair of load transmitting struts respectively disposed at each side of the vehicle and extending upwardly and rearwardly in substantially a straight line of inclination from said frame structure, means for structurally securing the lower ends of said struts to said frame structure, means for structurally connecting the upper ends of said struts respectively to said front columns at points intermediate the height thereof so constructed and arranged to transmit at least a portion of the load on said frame structure compressively through said struts to said hollow top rail structures, a second pair of load transmitting strut structures respectively disposed at each side of the vehicle and curving upwardly and rearwardly from substantially the front end of said frame structure, the rear ends of said second pair of strut structures being arranged to transmit a further portion of the load on said frame structure compressively through said second pair of strut structures to said front door columns for loading said hollow top rail structures, a power plant hood cover disposed between said second pair of strut structures, and means for swingingly supporting said hood cover at its rear end to said second pair of strut structures.

55. In a motor vehicle structure, fabricated hollow top rail structures, bottom rail structures, front and rear columns connecting said rail structures, a front wheel supporting structure extending forwardly of said front columns and including a frame structure constructed and arranged to mount said wheels and the motor vehicle power plant, said front door columns and said top rail structures respectively defining marginal portions of door openings, a pair of load transmitting struts respectively disposed at each side of the vehicle and extending upwardly and rearwardly in substantially a straight line of inclination from said frame structure, means for structurally securing the lower ends of said struts to said frame structure, means for structurally connecting the upper ends of said struts respectively to said front columns at points intermediate the height thereof so constructed and arranged to transmit at least a portion of the load on said frame structure compressively through said struts to said hollow top rail structures, the front ends of said top rail structures inclining forwardly and downwardly to form the upper portions of said front columns, said structural connecting means for the upper ends of said struts joining said front columns substantially adjacent the respective lower ends of said forwardly and downwardly inclined column portions, and a second pair of load transmitting strut structures respectively disposed at each side of the vehicle and sloping upwardly and rearwardly from said frame structure at points respectively disposed forwardly of the lower ends of the first said struts, the rear ends of said second pair of strut structures being arranged to transmit a further portion of the load on said frame structure compressively through said second pair of strut structures and said upper front column portions to said hollow top rail structures.

HAROLD A. HICKS.